US012177791B2

(12) United States Patent
Sava et al.

(10) Patent No.: US 12,177,791 B2
(45) Date of Patent: Dec. 24, 2024

(54) FIXED WIRELESS ACCESS FOR MULTI-UNIT STRUCTURES

(71) Applicant: T-MOBILE INNOVATIONS LLC, Overland Park, KS (US)

(72) Inventors: Herkole Sava, Centreville, VA (US); Michael Scott Witherell, Portland, OR (US); Ankit Arvind Muchhala, Leesburg, VA (US); Zheng Fang, McLean, VA (US)

(73) Assignee: T-MOBILE INNOVATIONS LLC, Overland Park, KS (US)

( * ) Notice: Subject to any disclaimer, the term of this patent is extended or adjusted under 35 U.S.C. 154(b) by 351 days.

(21) Appl. No.: 17/532,574

(22) Filed: Nov. 22, 2021

(65) Prior Publication Data

US 2023/0164705 A1    May 25, 2023

(51) Int. Cl.
*H04W 52/36* (2009.01)
*H04W 52/14* (2009.01)

(52) U.S. Cl.
CPC ......... *H04W 52/365* (2013.01); *H04W 52/14* (2013.01)

(58) Field of Classification Search
CPC ..... H04W 52/04; H04W 52/14; H04W 52/34; H04W 52/365; H04W 48/00; H04W 48/18; H04W 48/20
See application file for complete search history.

(56) References Cited

U.S. PATENT DOCUMENTS

| | | | | |
|---|---|---|---|---|
| 10,536,946 B2* | 1/2020 | Zhu | ........................ | H04W 48/18 |
| 10,560,204 B1* | 2/2020 | Patel | ..................... | H04W 48/12 |
| 10,971,872 B2* | 4/2021 | Chiu | ................... | H04W 88/085 |
| 11,056,780 B2* | 7/2021 | Polehn | ................. | H01Q 1/1285 |
| 11,172,544 B1* | 11/2021 | Jiang | ..................... | H04W 88/08 |

* cited by examiner

*Primary Examiner* — Quochien B Vuong
(74) *Attorney, Agent, or Firm* — Shook, Hardy & Bacon L.L.P.

(57) ABSTRACT

Embodiments of the present disclosure are directed to systems and methods for providing fixed wireless access to user devices located within structures. A structure, such as a multi-unit structure, may comprise one or more consolidated access points configured to wirelessly communicate with both a radio access network and one or more fixed wireless access devices that are coupled to an exterior window or wall of the structure. Fixed wireless access devices may have a portion mounted on the exterior of an exterior window or wall and comprise components to wirelessly communicate with the consolidated access point or radio access network. The fixed wireless access device may also have an interior portion mounted on the interior that routes signals to user devices within the structure and wirelessly powers the exterior portion.

19 Claims, 10 Drawing Sheets

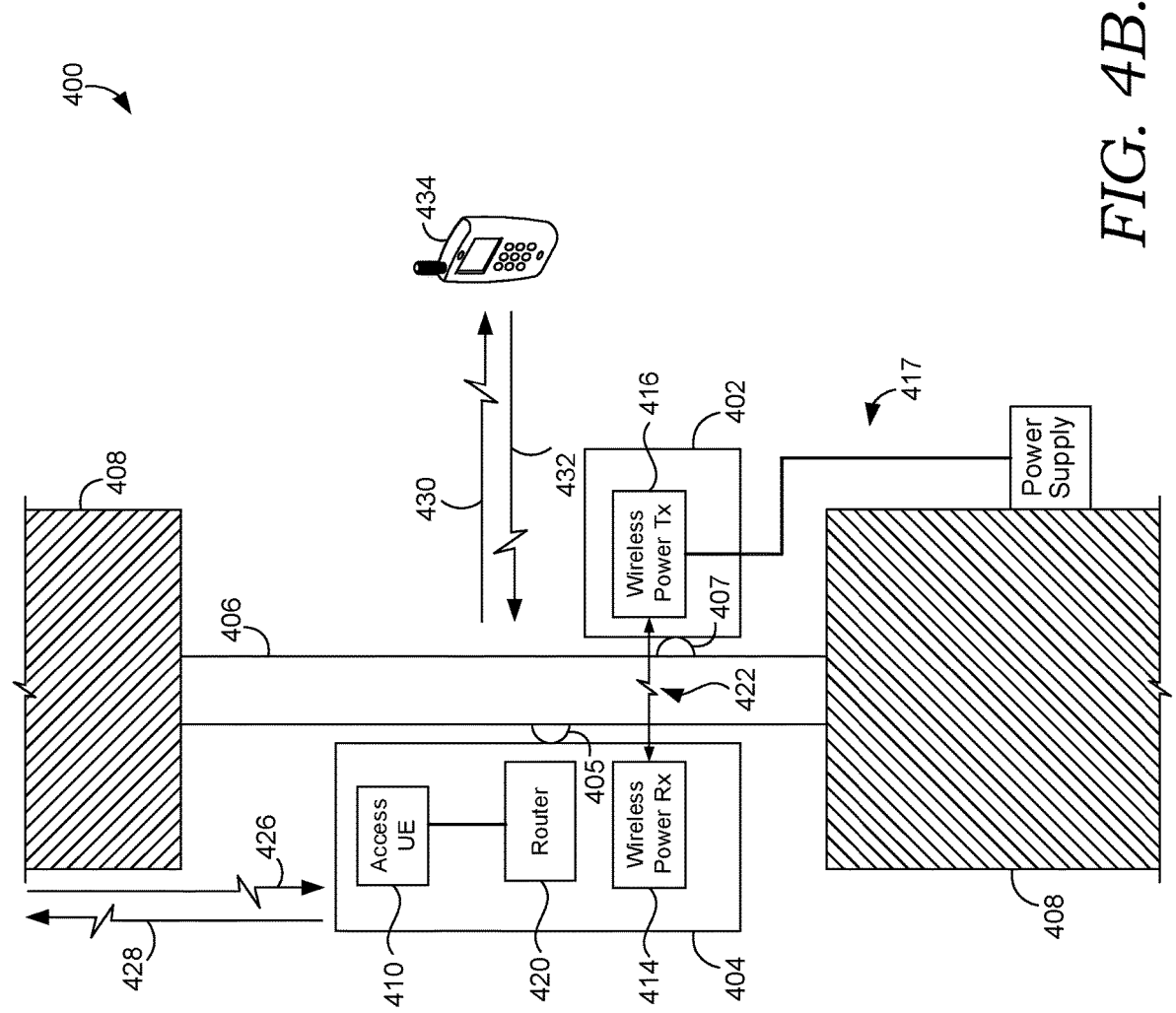

FIXED WIRELESS ACCESS FOR MULTI-UNIT STRUCTURES

SUMMARY

The present disclosure is directed, in part to fixed wireless access for multi-unit structures, including without limitation, multi-dwelling units, substantially as shown and/or described in connection with at least one of the figures, and as set forth more completely in the claims.

According to various aspects of the technology, any one or more components of a multi-tier solution, working alone or in tandem, are provided in order to improve or wholly create connectivity between a unit of a multi-unit structure and a desired network. Aspects of the present disclosure are directed to a fixed wireless access paradigm for a multi-unit structure, such as a multi-dwelling unit building. The fixed wireless access paradigm includes using one or more consolidated access points, which may be situated on or near a roof or exterior wall of the multi-unit structure, to communicate between a conventional wireless base station and one or more unit-specific fixed wireless access devices. The one or more consolidated access points utilize a directional signal to transmit a signal along the exterior wall of the multi-unit structure to serve a unit-specific device. The unit-specific device, utilizing a directional signal focused on the servicing consolidated access point, comprises an outside-unit component and an inside-unit component with a communicative and power connection there between. In other aspects, methods are disclosed for managing downlink and uplink signaling for providing fixed wireless access to unit-specific devices associated with the plurality of units of the multi-unit structure.

This summary is provided to introduce a selection of concepts in a simplified form that are further described below in the detailed description. This summary is not intended to identify key features or essential features of the claimed subject matter, nor is it intended to be used in isolation as an aid in determining the scope of the claimed subject matter.

BRIEF DESCRIPTION OF THE DRAWINGS

Aspects of the present disclosure are described in detail herein with reference to the attached figures, which are intended to be exemplary and non-limiting, wherein:

FIGS. 4A-4E illustrate various embodiments of fixed wireless access devices, in accordance with implementations of the present disclosure;

DETAILED DESCRIPTION

Figure 1:
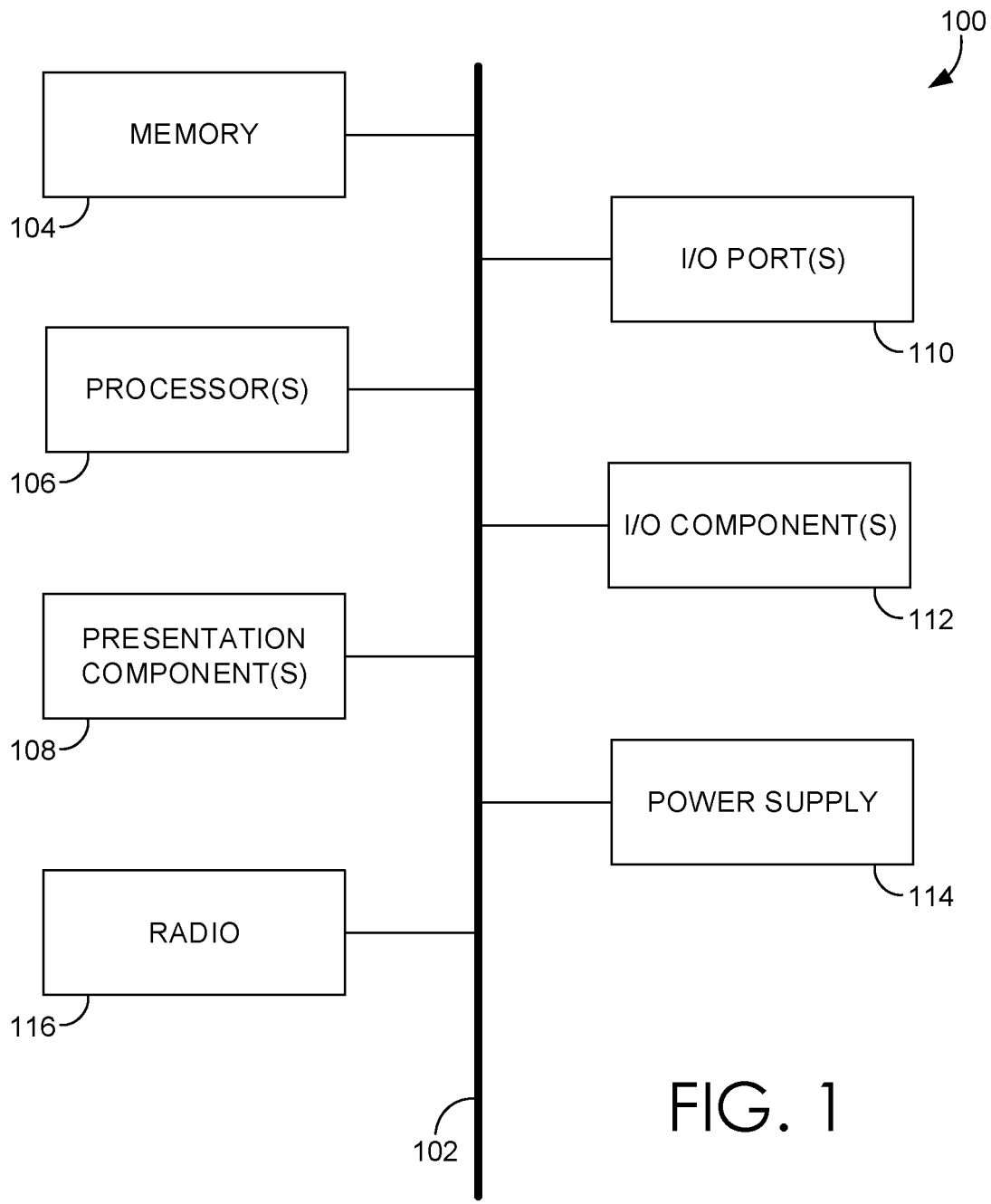
FIG. 1 illustrates an exemplary computing device for use with the present disclosure.

The subject matter of embodiments of the invention is described with specificity herein to meet statutory requirements. However, the description itself is not intended to limit the scope of this patent. Rather, it is contemplated that the claimed subject matter might be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Throughout this disclosure, several acronyms and shorthand notations are employed to aid the understanding of certain concepts pertaining to the associated system and services. These acronyms and shorthand notations are intended to help provide an easy methodology of communicating the ideas expressed herein and are not meant to limit the scope of embodiments described in the present disclosure. Unless otherwise indicated, acronyms are used in their common sense in the telecommunication arts as one skilled in the art would readily comprehend. Further, various technical terms are used throughout this description. An illustrative resource that fleshes out various aspects of these terms can be found in Newton's Telecom Dictionary, 31st Edition (2018). As used herein, the term "power headroom" refers to a difference between a maximum amount of power that could be used for transmitting a signal and an amount of power being used or which may be otherwise available to transmit a signal; for example, if a device has a maximum transmission power of 27 dBm and is currently using 24 dBm to transmit signals, it may be said to have a power headroom of 3 dBm. In another example, if the device were not currently transmitting a signal but it was determined that a potential transmission would require (or would use) 21 dBm, the device may be said to have a power headroom of 6 dBm.

Embodiments of the disclosed technology may be embodied as, among other things, a method, system, or computer-program product. Accordingly, the embodiments may take the form of a hardware embodiment, or an embodiment combining software and hardware. An embodiment takes the form of a computer-program product that includes computer-useable instructions embodied on one or more computer-readable media. Computer-readable media include both volatile and nonvolatile media, removable and nonremovable media, and contemplate media readable by a database, a switch, and various other network devices. Network switches, routers, and related components are conventional in nature, as are means of communicating with the same. By way of example, and not limitation, computer-readable media comprise computer-storage media and communications media. Implementations of the present disclosure may be described in the general context of computer code or machine-useable instructions, including computer-executable instructions such as program components, being executed by a computer or other computer processing component. Generally, program components, including routines, programs, objects, components, data structures, and the like, refer to code that performs particular tasks or implements particular abstract data types. Implementations of the present disclosure may also be practiced in distributed computing environments where tasks are performed by remote-processing devices that are linked through a communications network.

Computer-storage media, or machine-readable media, include media implemented in any method or technology for storing information. Examples of stored information include computer-useable instructions, data structures, program modules, and other data representations. Computer-storage media include, but are not limited to RAM, ROM, EEPROM, flash memory or other memory technology, CD-ROM, digital versatile discs (DVD), holographic media or other optical disc storage, magnetic cassettes, magnetic tape, magnetic disk storage, and other magnetic storage devices and may be considered transitory, non-transitory, or a combination of both. These memory components can store data momentarily, temporarily, or permanently.

Communications media typically store computer-useable instructions—including data structures and program modules—in a modulated data signal. The term "modulated data signal" refers to a propagated signal that has one or more of its characteristics set or changed to encode information in the signal. Communications media include any information-delivery media. By way of example but not limitation, communications media include wired media, such as a wired network or direct-wired connection, and wireless media such as acoustic, infrared, radio, microwave, spread-spectrum, and other wireless media technologies. Combinations of the above are included within the scope of computer-readable media.

Conventionally, in order to provide access to internet resources, end users have relied on internet service providers (ISP) to create a wired connection from the ISP's network (or a network affiliated with the ISP) to the user's location. In single family residences, conventional wired connectivity may be relatively straightforward; a wired connection is created from a local trunk line to a dwelling and then the wired connection is provided to a modem which converts signals into a usable form for a router, which provides service, whether via wired (e.g., Ethernet) or wireless (e.g., Wi-Fi) to end-user devices. In multi-unit structures (MUS), however, the provision of wired internet services often becomes exponentially more burdensome with size—running wired connections to each unit of an MUS is both labor and material-intensive. Alternatives, such as centrally-installed Wi-Fi access points or mesh networks may also be burdensome or overly complex to install and may additionally have significant limitations based on the attenuation of signals as they propagate through the numerous layers of building materials and contents of an MUS. Accordingly, providing connectivity to end-users in an MUS is currently an expensive, and/or time-consuming proposition or those end-users are limited to inferior connectivity.

In order to solve the problems faced by conventional solutions for providing connectivity to devices within a unit of an MUS, the present disclosure is directed to systems, methods, devices, and computer readable media for providing connectivity to units of an MUS in a fixed wireless access paradigm Eliminating the need for specialized and time-consuming installation of physical wiring to every unit of an MUS, a unit-specific device, capable of being mounted/installed by a non-technician occupant of each unit, provides both wireless connectivity to the interior of the unit and is also configured to wirelessly communicate with a consolidated access point on the exterior of the MUS. Minimizing attenuation both internally and in the backhaul to the consolidated access point, the unit-specific device is configured to be installed at or on an exterior surface of each unit, such as on a window of the unit. The consolidated access point on the exterior of the MUS then communicates with a conventional wireless base station.

Accordingly, a first aspect of the present disclosure is directed to device for providing fixed wireless access to a unit of a multi-unit structure, the fixed wireless access comprising an interior portion comprising a wireless power transmitter and a router, wherein the router is configured to communicate with one or more user devices using a wireless link. The device further comprises an exterior portion comprising a wireless power receiver configured to wirelessly receive power from the wireless power transmitter and an access user equipment (UE), wherein the access UE is configured to communicate with an access point.

A second aspect of the present disclosure is directed to a system for providing fixed wireless access to a multi-unit structure comprising a radio access network. The system further comprises a base station coupled to a multi-unit structure, the base station comprising a first antenna system configured to be wirelessly connected to the radio access network. The system further comprises a second antenna system communicatively coupled to the base station and configured to directionally transmit downlink signals to one or more fixed wireless access devices and receive signals from the one or more fixed wireless access devices, wherein the downlink signals are directionally transmitted coplanar with an exterior wall of the multi-unit structure.

According to another aspect of the technology described herein, one or more computer-readable media is provided having computer-executable instructions embodied thereon that, when executed, cause the one or more processors to perform a method comprising receiving, at a distribution node, a channel quality report and an uplink scheduling request from a fixed wireless access device, the scheduling request comprising a request for a first amount of uplink radio resources. The method further comprises determining, based at least in part on the channel quality report, an uplink transmission power necessary for the fixed wireless access device. The method further comprises determining, based on the power supplied to the fixed wireless access device and the uplink transmission power, a power headroom available to the fixed wireless access device. The method further comprises determining a modulation coding scheme that requires less power than the power headroom. The method further comprises communicating an uplink transmission instruction to the fixed wireless access device, the uplink transmission instruction comprising the uplink transmission power, the modulation coding scheme, and an uplink resource allocation, wherein the uplink resource allocation is for a second amount of uplink radio resources, the second amount of uplink radio resources greater than the first amount of uplink radio resources. The method further comprises receiving uplink data from the fixed wireless access device according to the uplink transmission instruction.

Another aspect of the technology is directed to a method for communicating uplink data from a fixed wireless access device to a distribution node, the method comprising communicating a channel quality report to the distribution node. The method further comprises receiving a first amount of uplink data from a connected user device and, in response, communicating a first uplink scheduling request to the distribution node for a first amount of radio resources, the first amount of radio resources corresponding to the first amount of uplink data from the connected user device. The method further comprises receiving a second amount of uplink data from the connected user device and, in response communicating a second uplink scheduling request to the distribution node for a second amount of radio resources, the second amount of radio resources corresponding to the second amount of uplink data from the connected user device. The method further comprises receiving an uplink instruction from the distribution node, the uplink instruction comprising an uplink transmission power, an uplink modulation coding scheme, and an uplink allocation, wherein the uplink allocation corresponds to a third amount of radio resources, the third amount of radio resources being greater than each of the first and the second amount of radio resources. The method further comprises transmitting, using the uplink instruction, the first amount of uplink data together with the second amount of uplink data corresponding to the third amount of radio resources.

Referring to FIG. 1, a diagram is depicted of an exemplary computing environment suitable for use with implementations of the present disclosure. In particular, the exemplary computer environment is shown and designated generally as computing device 100. Computing device 100 is but one example of a suitable computing environment and is not intended to suggest any limitation as to the scope of use or functionality of the invention. Neither should computing device 100 be interpreted as having any dependency or requirement relating to any one or combination of components illustrated. In aspects, the computing device 100 may be a UE, WCD, or other user device, capable of two-way wireless communications with an access point. Some non-limiting examples of the computing device 100 include a cell phone, tablet, pager, personal electronic device, wearable electronic device, activity tracker, desktop computer, laptop, PC, and the like.

The implementations of the present disclosure may be described in the general context of computer code or machine-useable instructions, including computer-executable instructions such as program components, being executed by a computer or other machine, such as a personal data assistant or other handheld device. Generally, program components, including routines, programs, objects, components, data structures, and the like, refer to code that performs particular tasks or implements particular abstract data types. Implementations of the present disclosure may be practiced in a variety of system configurations, including handheld devices, consumer electronics, general-purpose computers, specialty computing devices, etc. Implementations of the present disclosure may also be practiced in distributed computing environments where tasks are performed by remote-processing devices that are linked through a communications network.

With continued reference to FIG. 1, computing device 100 includes bus 102 that directly or indirectly couples the following devices: memory 104, one or more processors 106, one or more presentation components 108, input/output (I/O) ports 110, I/O components 112, and power supply 114. Bus 102 represents what may be one or more busses (such as an address bus, data bus, or combination thereof). Although the devices of FIG. 1 are shown with lines for the sake of clarity, in reality, delineating various components is not so clear, and metaphorically, the lines would more accurately be grey and fuzzy. For example, one may consider a presentation component such as a display device to be one of I/O components 112. Also, processors, such as one or more processors 106, have memory. The present disclosure hereof recognizes that such is the nature of the art, and reiterates that FIG. 1 is merely illustrative of an exemplary computing environment that can be used in connection with one or more implementations of the present disclosure. Distinction is not made between such categories as "workstation," "server," "laptop," "handheld device," etc., as all are contemplated within the scope of FIG. 1 and refer to "computer" or "computing device."

Computing device 100 typically includes a variety of computer-readable media. Computer-readable media can be any available media that can be accessed by computing device 100 and includes both volatile and nonvolatile media, removable and non-removable media. By way of example, and not limitation, computer-readable media may comprise computer storage media and communication media. Computer storage media includes both volatile and nonvolatile, removable and non-removable media implemented in any method or technology for storage of information such as computer-readable instructions, data structures, program modules or other data.

Computer storage media includes RAM, ROM, EEPROM, flash memory or other memory technology, CD-ROM, digital versatile disks (DVD) or other optical disk storage, magnetic cassettes, magnetic tape, magnetic disk storage or other magnetic storage devices. Computer storage media does not comprise a propagated data signal.

Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer-readable media.

Memory 104 includes computer-storage media in the form of volatile and/or nonvolatile memory. Memory 104 may be removable, nonremovable, or a combination thereof. Exemplary memory includes solid-state memory, hard drives, optical-disc drives, etc. Computing device 100 includes one or more processors 106 that read data from various entities such as bus 102, memory 104 or I/O components 112. One or more presentation components 108 presents data indications to a person or other device. Exemplary one or more presentation components 108 include a display device, speaker, printing component, vibrating component, etc. I/O ports 110 allow computing device 100 to be logically coupled to other devices including I/O components 112, some of which may be built in computing device 100. Illustrative I/O components 112 include a microphone, joystick, game pad, satellite dish, scanner, printer, wireless device, etc.

Radio 116 represents a radio that facilitates communication with a wireless telecommunications network. In aspects, the radio 116 utilizes one or more transmitters, receivers, and antennas to communicate with the wireless telecommunications network on a first downlink/uplink channel. Though only one radio is depicted in FIG. 1, it is expressly conceived that the computing device 100 may have more than one radio, and/or more than one transmitter, receiver, and antenna for the purposes of communicating with the wireless telecommunications network on multiple discrete downlink/uplink channels, at one or more wireless nodes. Illustrative wireless telecommunications technologies include CDMA, GPRS, TDMA, GSM, ODFM, ODFMA, and the like. Radio 116 might additionally or alternatively facilitate other types of wireless communications including Wi-Fi, WiMAX, LTE, 5G, or other VoIP communications. As can be appreciated, in various embodiments, radio 116 can be configured to support multiple technologies and/or multiple radios can be utilized to support multiple technologies. A wireless telecommunications network might include an array of devices, which are not shown so as to not obscure more relevant aspects of the invention. Components such as a base station, a communications tower, or even access points (as well as other components) can provide wireless connectivity in some embodiments.

One or more components of computing device 100 may be referred to herein as an "access UE." For the purposes of this disclosure, a device referred to as an access UE is a particular type of computing device 100 that includes some components described with respect to FIG. 1 but is likely to omit others. The access UE is a component of a broader device, such as a fixed wireless access device, wherein the access UE provides wireless connectivity between the fixed wireless access device and an access point or base station. Accordingly, the access UE, for example, comprises a processor 106, power supply 114, radio 116, and bus 102. In aspects, the access UE would not comprise a presentation component 108 and the I/O port(s) 110 and/or I/O component(s) 112 may take the form of a wired connection that interfaces between the remainder of the access UE and the remainder of the fixed wireless access device. As described in greater detail with respect to other portions of this disclosure, the radio 116 of an access UE may take the form of a relay or a conventional radio such as those that would be found in other types of modern UEs (e.g., a mobile telephone, tablet, or computer). Further, the radio 116 of the access UE comprises a sufficient number of antennas to transmit signals in the uplink that are sufficiently directional to reach an access point but few enough antennas that the power required to transmit signals in the uplink does not exceed a desired threshold.

Figure 2:
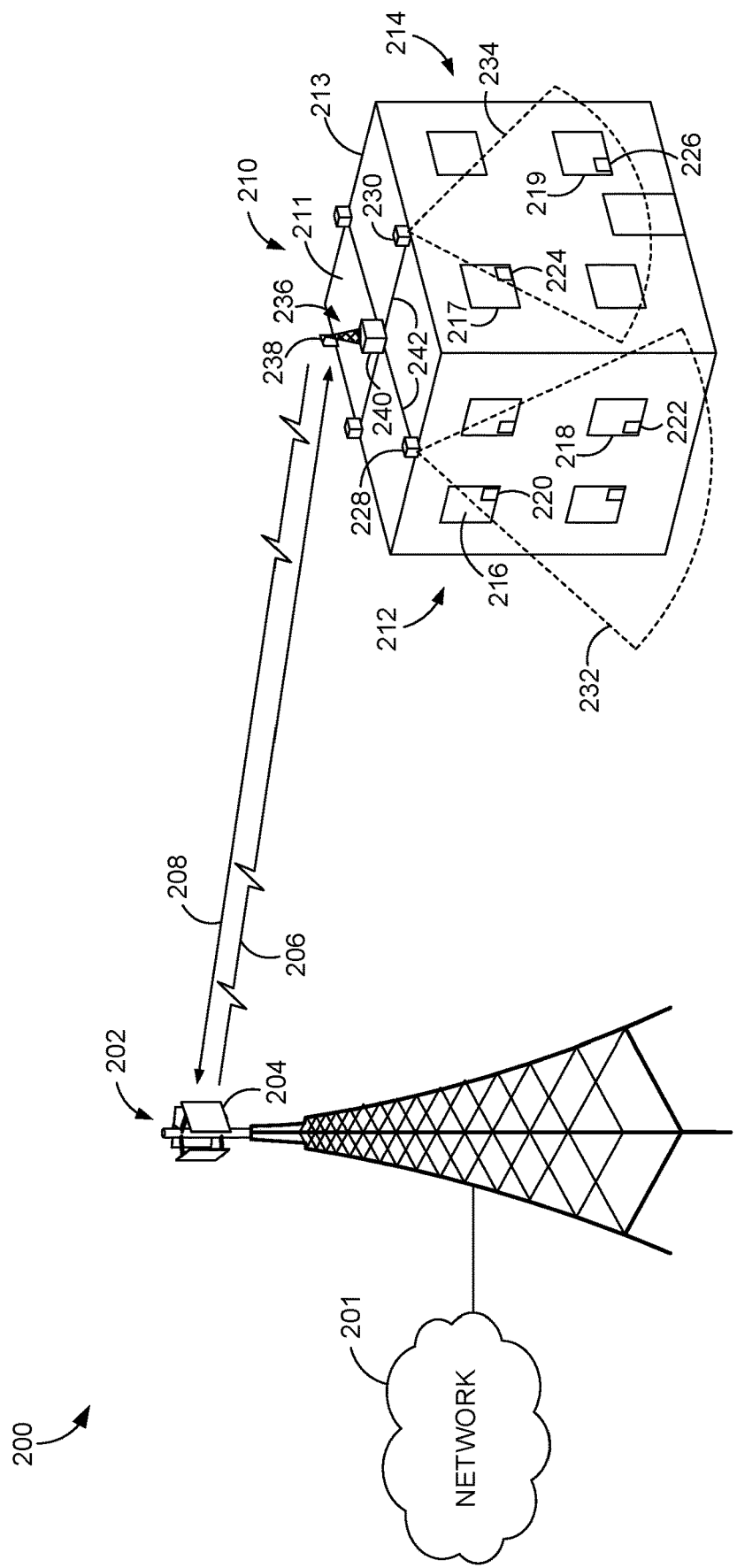
FIG. 2 illustrates a diagram of an exemplary network environment in which implementations of the present disclosure may be employed.

Turning now to FIG. 2, an exemplary network environment is illustrated in which implementations of the present disclosure may be employed. Such a network environment is illustrated and designated generally as network environment 200. Network environment 200 is but one example of a suitable network environment and is not intended to suggest any limitation as to the scope of use or functionality of the invention. Neither should the network environment be interpreted as having any dependency or requirement relating to any one or combination of components illustrated.

Network environment 200 represents a high level and simplified view of relevant portions of a system for providing fixed wireless access to multi-unit structures (MUS) in accordance with any one or more aspects of the presently disclosed invention. The network environment 200 may be said to comprise a radio access network (RAN) 202, a network 201, one or more consolidated access point components situated on an MUS 210, and a fixed wireless access (FWA) device. At the highest level, a wireless connection is provided between the RAN 202 and the one or more consolidated access point components situated on the MUS 210, and a wireless connection is provided between the one or more consolidated access point components and the FWA device; the pair of wireless connections allows an end-user device (not depicted in FIG. 2) associated with a unit of the MUS having the FWA equipment to access the network 201 via a connection with the FWA equipment.

The RAN 202 is generally configured to transmit and receive one or more signals between a base station and any equipment that is configured to rely on a wireless connection to access, or provide access to, a broader network such as network 201. The RAN 202 may take the form of a macro site or any other desirable telecommunication asset (e.g., a relay, such as small cell). The RAN 202 comprises an antenna system 204, such as a MIMO antenna array, that is configured to transmit downlink signals 206 and receive uplink signals 208 using an air interface. The RAN 202 utilizes any desirable wireless protocol to carry out its wireless communications, such as the 4G, 5G, or 6G wireless telecommunication protocol. So as not to obscure the pertinent parts of the invention, the RAN 202 may be said to be communicatively coupled to the network 201. The connection between the RAN 202 and the network 201 may generally be said to provide access to the world wide web or internet for equipment wirelessly connected to and therefore said to be served by the RAN 202 (in practice, the relationship between the RAN 202 and the network 201 may take the form of a complex system of several distinct networks, components, routers, and the like).

The network environment comprises the MUS 210 which may be generally said to be sub-divided into, or comprise, a plurality of units. As used herein, a unit refers to a portion of a structure that is owned/leased/operated by an individual or entity and is understood to be distinct on the basis of said ownership/leasehold/operation. For example, the MUS 210 may take the form of an office building that comprises two or more units, wherein each unit is an office that is owned, leased, or operated by a different commercial entity (e.g., a first unit may be a law office and a second unit may be a financial advisor's office); in another example, the MUS 210 may take the form of a multi-dwelling unit, such as an apartment building, a house divided into individual units for occupancy by multiple families, a condominium, or the like. In another example, the MUS 210 may be mixed-use and comprise a combination of commercial and residential units. Regardless of the particular occupants of the MUS 210, the MUS 210 will have one or more exterior walls. Though it is acknowledged that most buildings comprise at least four exterior walls, the present disclosure is expressly conceived to work with any number of exterior walls. For the purposes of illustrating various details of the present disclosure, FIG. 2 illustrates one particular form of the disclosure wherein the MUS 210 comprises four exterior walls, including a first exterior wall 212 and a second exterior wall 214. For the sake of simplicity of illustration and so as not to obscure aspects of the present disclosure, each of the four exterior walls, including the first exterior wall 212 and the second exterior wall 214 are shown as having a face that is generally planar; however, a MUS 210 compatible with the present disclosure may have exterior walls having faces that are not generally planar.

The MUS 210 of FIG. 2 is illustrated as comprising a first unit 216 and a second unit 218, each represented by (and comprising) a window on the first exterior wall 212, and a third unit 217 and a fourth unit 219, each represented by (and comprising) a window on the second exterior wall 214. Though each unit discussed herein is associated with a single window, a single unit may comprise multiple windows, or a particular unit may be disposed such that the unit is disposed adjacent to an exterior wall but does not comprise a window. In aspects, each unit may have a fixed wireless access device deployed adjacent to the unit's exterior window or wall; for example, the first unit 216 may have a first fixed wireless access device 220, the second unit 218 may have a second fixed wireless access device 222, the third unit 217 may have a third fixed wireless access device 224, and the fourth unit 219 may have a fourth fixed wireless access device. In other aspects, multiple units may share a single fixed wireless access device (e.g., the first unit 216 and a neighbor of the first unit 216 may share the first fixed wireless access device 220). In yet other aspects, a single unit may have multiple fixed wireless access devices (e.g., the first unit 216 comprises the entire floor on the first exterior wall 212 and has one or more fixed wireless access devices deployed in addition to the first fixed wireless access device 220. The MUS 210 is understood to have a roof 211 generally defined by and having a roof edge 213, wherein the roof edge 213, as used herein, generally refers to the approximate union of the roof 211 and a particular exterior wall, such as the first exterior wall 212 or the second exterior wall 214.

The network environment 200 comprises a consolidated access point 236 which is generally configured to provide a wireless communication link between the MUS 210 and the RAN 202. The consolidated access point may generally be said to comprise a backhaul antenna system 238, at least one MUS terminal unit (MUS-TU) 240, and at least one distribution node 228. Though illustrated as being disposed on the roof of the MUS 210, any one or more portions of the consolidated access point 236, including the backhaul antenna system 238, the MUS-TU 240 and the at least one distribution node 228, may be otherwise disposed (e.g., on a tower/mast, on an exterior wall of the MUS 210, inside the MUS 210, or on a mounting device (e.g., a boom or arm that is mounted to but extends away from the MUS 210). To satisfy varying implementation requirements, the consolidated access point 236 may be generally deployed in a distributed embodiment, a unitary embodiment, or a hybrid embodiment. As will be appreciated, many features, functions, and characteristics described with respect to one embodiment may be implemented with the other general deployment embodiments. For the sake of clarity, the distributed embodiment of the consolidated access point 236 is illustrated in FIG. 2.

The consolidated access point 236 wirelessly communicates with the RAN 202 via the downlink signal 206 and the uplink signal 208, using the backhaul antenna system 238. The backhaul antenna system 238 may take any desirable form, including but not limited to an antenna array having multiple elements, for example that is configured for Multiple-In, Multiple-Out (MIMO). In other aspects, the backhaul antenna system 238 may be any antenna system suitable for directional or point to point communication with the RAN 202. For example, using multiple elements, the backhaul antenna system 238 could use beamforming by manipulating amplitude and/or phase of signals supplied to each element of the antenna system in order to create a focused lobe with high gain that wirelessly connects the consolidated access point 236 and the RAN 202 and/or that creates nulls that would prevent or mitigate interference caused by incidental communication with other RAN assets. In another example, the backhaul antenna system 238 may comprise a point to point link system such as a VHF, UHF, EHF, or yet higher frequency system (e.g., a microwave system or millimeter wave system). The backhaul antenna system 238 is configured for both transmission and reception of signals; thus, the backhaul antenna system 238 may comprise dedicated transmission elements and dedicated receiving elements (e.g., the dedicated transmission elements may be cross-polarized with the dedicated receiving elements, or a first array of cross-polarized elements may be the dedicated transmission elements and a second array of cross-polarized elements may be the dedicated receiving elements). Alternatively, the backhaul antenna system 238 may utilize a single set of elements that could be used for both transmitting uplink signals and receiving downlink signals. In one aspect, the backhaul antenna system 238 does not comprise cross-polarized elements, which may reduce complexity and deployment cost for consolidated access points 236 that are used with a particular backhaul node, such as RAN 202 and are unlikely to encounter multipath or otherwise spatially polarized downlink signals 206, for example.

The consolidated access point 236 further comprises a MUS-TU 240, which, in some aspects, may perform one or more functions of a base transceiver station in that it is generally responsible for managing the flow of information between a plurality of user devices and the RAN 202. Accordingly, the MUS-TU 240 comprises one or more computer processing components that perform operations relating to scheduling, encoding/decoding, signal conversion, frame building, signal amplification, and the like. For example, the MUS-TU 240 may perform content caching for connected user devices by aggregating/storing content communicated to the MUS-TU 240 from either the RAN 202 or a connected device and then communicating the aggregated content from the cache to its intended location. Though not illustrated, the MUS-TU 240 may be powered using a power supply available on the roof 211 of the MUS 210, enabling the MUS-TU 240 to perform most or all of the signal processing functions of the consolidated access point 236. The MUS-TU 240 is communicatively coupled to both the backhaul antenna system 238 and the one or more distribution nodes and may, as will be discussed in greater detail, standalone from the one or more distribution nodes or be integrated with one or more distribution nodes.

The consolidated access point 236 comprises one or more distribution nodes (e.g., a first distribution node 228 and a second distribution node 230) that are configured to transceive signals along one or more exterior walls. Each distribution node comprises at least an antenna system and power amplifier configured to transmit signals received from the MUS-TU 240 to a fixed wireless access device and to receive signals from a fixed wireless access device and communicate them to the MUS-TU 240. The antenna system of each distribution node may comprise multiple elements, operating as an array (e.g., a MIMO array), to facilitate the use of multiple access schemes (OFDMA, TDMA, CDMA, etc.) in the downlink. Each distribution node may utilize frequency bands that are spectrally efficient for short, line of sight communication for communicating with a fixed wireless access device, such as UHF or higher bands including mmWaves and microwaves. In aspects, the frequency band(s) used to communicate between the distribution nodes and the fixed wireless access device may be different than the frequency band(s) used to communicate between the backhaul antenna system 238 and the RAN 202, both of which may be different than the frequency band(s) used by the fixed wireless access device for providing service to a unit.

As illustrated in FIG. 2, each exterior wall of the MUS 210 is served by a distinct distribution node; for example, the first exterior wall 212 is served by the first distribution node 228 and the second exterior wall 214 is served by the second distribution node 230. Each distribution node may comprise a directional antenna system that operates to provide signals along their respective exterior wall but minimizes or does not transmit signals to areas beyond the exterior wall that it serves. Each distribution node may be coupled to the MUS 210, directly or indirectly (e.g., via a boom). Though shown as deployed at or near the roof edge 213, it is conceived that a distribution node could alternatively be deployed on the side of the MUS 210 at or near the horizontal extremis of each exterior wall (for example, the corner of the building where the first exterior wall 212 joins the second exterior wall). When deployed on the side of the MUS 210, each distribution node may be generally configured to transmit signals that extend outward in a predominantly horizontal direction (in contrast to roof edge deployments that will transmit signals to extend outward in a predominantly vertical direction). In aspects where the distributed nodes are wished to be hidden, a distributed node may be coupled directly to the face of an exterior wall and painted or otherwise visually obfuscated. Though only one distribution node is illustrated as being deployed for each exterior wall, it is conceived that a plurality of distribution nodes may be deployed for each exterior wall.

Figure 3:
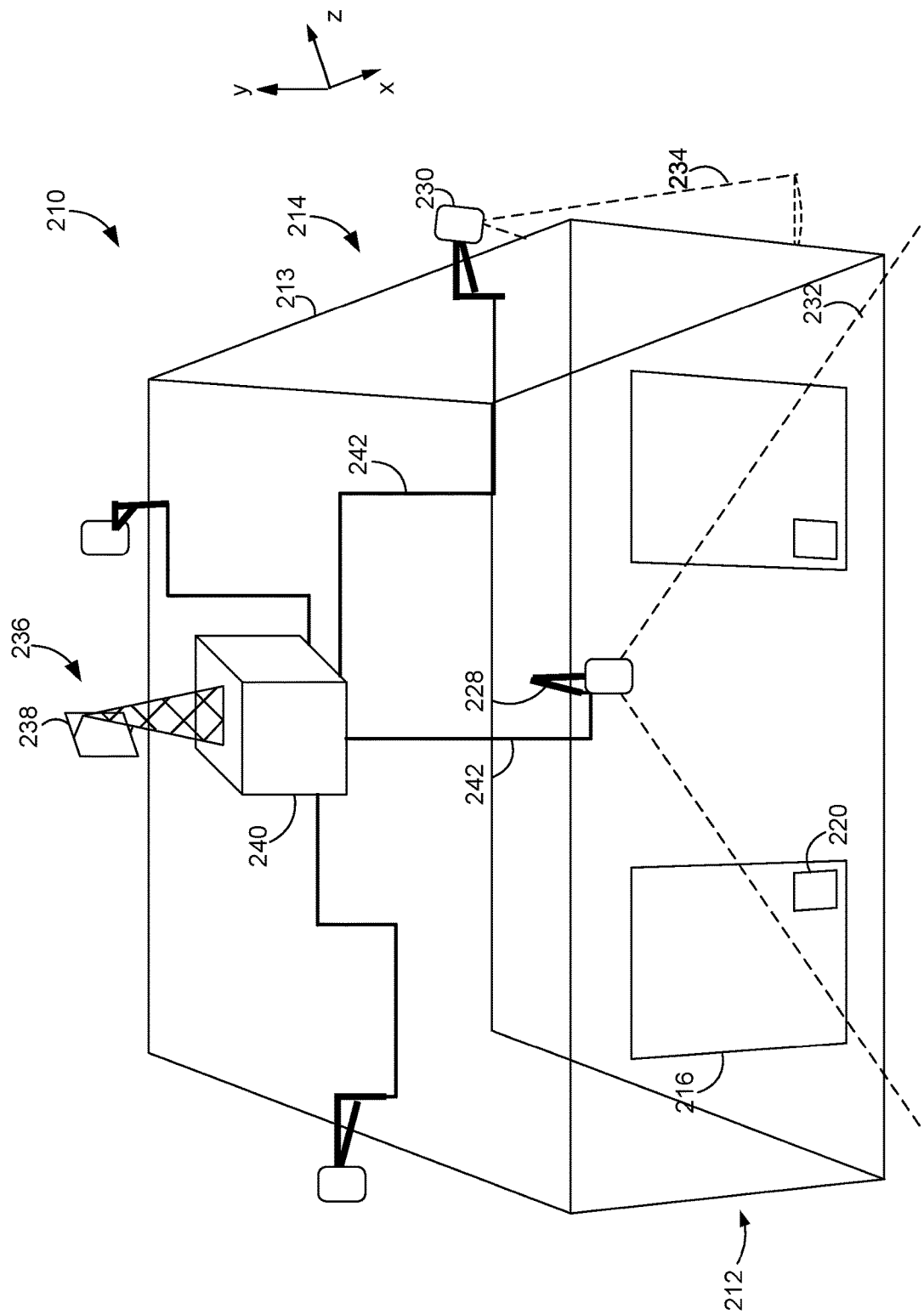
FIG. 3 illustrates a portion of the network environment of FIG. 2, in accordance with implementations of the present disclosure.

As seen in greater detail in FIG. 3, in aspects where provision of service is the primary driver, for example, a distributed node may be attached to a boom or outrigger that places the distribution node a distance beyond the roof edge 213. The second distribution node 230 illustrates that by placing the distribution node a distance (e.g., 6-24 inches) beyond the roof edge 213, a distribution node may be physically or electronically tilted/canted towards the exterior wall of the MUS 210 that the distribution node serves. A suitable downlink beamform of each of the distribution nodes may appear to be a digital curtain that drapes a particular exterior wall. For example, the first distribution node 228 may have a first exterior wall downlink beamform 232 that generally provides coverage for the first exterior wall 212 and the second distribution node 230 may have a second exterior wall downlink beamform 234 that generally provides coverage for the second exterior wall 214. As best seen with the second exterior wall downlink beamform 234, downlink signals from the distributed nodes may be steered/canted towards the exterior wall of the MUS 210. Illustratively, an exterior wall of the MUS 210 (such as the second exterior wall 214) may be said to form a Y-plane (i.e., a vertical line on the second exterior wall formed a Y-axis), an axis normal to the face of the second exterior wall 214 formed a Z-axis, and a horizontal line along the second exterior wall formed an X-axis. A distribution node, such as the second distribution node 230 may be canted at a negative angle along the z-axis (i.e., so that the transmitting end is canted towards the second exterior wall 214) in order to physically steer the second exterior wall downlink beamform 234 so that it also is angled negatively along the z-axis (e.g., 5-15 degrees). The second exterior wall downlink beamform 234 may have a width in the x-axis of 45-120 degrees, depending on the particulars of the deployment (e.g., if multiple distribution nodes served the second exterior wall 214, each of the multiple distribution nodes may have a narrower width in the x-axis). In the y-axis, the second exterior wall downlink beamform 234 may extend outward from the second distribution node 230 to a distance based on the power used to transmit the second exterior wall downlink beamform 234. In aspects, the second exterior wall downlink beamform 234 may be transmitted with an amount of power, based on channel conditions, such that the edge of the beamform is approximately ground or entry level for the MUS 210. In other aspects, the second exterior wall downlink beamform 234 may be transmitted with more or less power than the previous aspect, such that the most distant fixed wireless access device from the second distribution node that is served by the second distribution node is provided with a minimum power downlink signal.

Returning now to FIG. 2, the consolidated access point 236 may be deployed according to multiple embodiments. In a distributed embodiment, the MUS-TU 240 is separate from and connected to a plurality of non-adjacent distributed nodes. For example, as seen in FIG. 2, the MUS 210 has four exterior walls with one distributed node deployed to serve each exterior wall; in the distributed embodiment, single MUS-TU 240 may serve, control, and therefore be connected to each of the four distributed nodes. Though shown as being connected via a wired connection 242 (e.g., coaxial cable, Ethernet cable, or other feed cable), the MUS-TU 240 may be connected to the plurality of distributed nodes via a wireless point to point connection (e.g., mmWaves). Though shown as being centrally located on the roof 211, in the distributed embodiment, the MUS-TU 240 and the backhaul antenna system 238 may be located in any desirable location on or near the roof 211 of the MUS 210.

In a unified embodiment, the MUS-TU 240 and backhaul antenna system 238 may be combined with each distributed node; for example, the first distributed node 228 may be combined with the MUS-TU 240 and the backhaul antenna system 238. Therefore, because the MUS 210, as illustrated, has four exterior walls, and one distributed node for each exterior wall, the MUS 210 would comprise four distinct consolidated access points (each having its own MUS-TU 240 and backhaul antenna system 238). The unified embodiment may be particularly desirable if, in but one example, the MUS 210 only has one exterior wall. In a third, hybrid embodiment, the MUS-TU 240 is connected to two, adjacent, distributed nodes. For example, with respect to the MUS 210, the MUS-TU 240 may be communicatively coupled to only the first distribution node 228 and the second distribution node 230, and the single base station, serving both distribution nodes, would also be communicatively coupled to a dedicated backhaul antenna system 238; in other words, assuming the MUS 210 has four exterior walls and one distributed node for each exterior wall, the MUS 210 would have two consolidated access points, wherein each consolidated access point comprised a single backhaul antenna system, a single base station, and two distribution nodes.

In aspects of the hybrid embodiment, the two adjacent distribution nodes may be configured to serve two different exterior walls; for example, the consolidated access point 236 may comprise the first distribution node 228 and the second distribution node 230, wherein the first distribution node 228 is configured to serve the first exterior wall 212 and the second distribution node 230 is configured to serve the second exterior wall 214. In such an aspect, the first distribution node 228 and the second distribution node 230 may be located proximate to the corner of the roof edge 213 where the first exterior wall 212 and the second exterior wall 214 meet, in which case the MUS-TU 240 may be combined with both the first distribution node 228 and the second distribution node 230. Alternatively, if each of the first distribution node 228 and the second distribution node 230 are located more centrally on the roof edge 213 on their respective exterior walls, the MUS-TU 240 and backhaul antenna system 238 may be collocated at a first location on the roof 211 and each of the first and second distribution nodes 228, 230 may be located at a second and third location, respectively. In yet other aspects, hybrid embodiments of the consolidated access point 236 may be configured wherein each of the two connected distribution nodes serve the same exterior wall, wherein each exterior wall has a separate consolidated access point.

Regardless of the particular deployment embodiment, the consolidated access point 236 may utilize a modified uplink messaging sequence in order to provide enhanced connectivity between the RAN 202 and fixed wireless access devices. Conventionally, base stations utilize a downlink to uplink ratio; for example, 15 downlink radio resources may be allocated/scheduled for every 1 uplink radio resource. Instead of operating in a conventional mode, the one or more components of the consolidated access point 236 act as a controller for resource scheduling, allowing for dynamic scheduling of downlink and uplink resources and link adaptation. For example, in a first aspect, the MUS-TU 240 may be configured to execute all scheduling and link adaptation operations and a distribution node may be configured as a relay, in a second aspect, the MUS-TU 240 may split scheduling and link adaptation operations (e.g., the distribution node(s) may handle scheduling and/or content caching but the MUS-TU 240 may handle link adaptation), in a third aspect, scheduling and link adaptation operations may be performed by the distribution node(s) and the MUS-TU 240 may be configured to aggregate information from the distribution node(s) and relay aggregated information to the RAN 202. In any aspect, the consolidated access point 236 may interact with a particular fixed wireless access device, such as the first fixed wireless access device 220 using orthogonal frequency domain multiplexing (OFDM), single carrier mode, or any other desirable transmission scheme (said interaction occurring via a distribution node as described above). Scheduling radio resources in terms of the downlink to uplink ratio may be carrier-configurable and may generally be said to be either static (a set ratio that is always in effect, but which may be modified by the carrier) or dynamic (the ratio may change based on one or more factors such as anticipated traffic, actual traffic, time of day/week, and the like). Periodically, or upon the particular fixed wireless access device needing to transmit uplink data to the consolidated access point 236, the particular fixed wireless access device will transmit a sounding signal and/or a channel quality report to the consolidated access point 236. Upon the particular fixed wireless access point needing to transmit uplink data to the consolidated access point 236, the particular fixed wireless access device will generate a buffer status report for uplink slot scheduling and communicate the buffer status report and uplink slot scheduling request to the consolidated access point 236. In response, the consolidated access point 236 may immediately allocate an uplink time slot for the particular fixed wireless access device or may perform a delayed allocation.

In aspects where the consolidated access point 236 performs immediate uplink resource allocation, the consolidated access point 236 determines a modulation coding scheme and uplink transmission power that the particular fixed wireless access device should use to communicate the uplink data and allocates dedicated uplink resources (e.g., time or frequency slot(s)) for uplink data transmission in response to the consolidated access point 236 receiving any buffer status report and scheduling request from the particular fixed wireless access device. In aspects where the consolidated access point 236 performs a delayed uplink resource allocation, the consolidated access point 236 determines a modulation coding scheme and uplink transmission power that the particular fixed wireless access device should use to communicate the uplink data and allocates dedicated uplink resources (e.g., time or frequency slot(s)) for uplink data transmission after a carrier-configured predetermined time delay (e.g., 1 millisecond-1 second) or after the consolidated access point 236 receives a predetermined threshold number of uplink slot scheduling requests from the particular fixed wireless access device (e.g., 2-14 requests). In the delayed uplink resource allocation aspect, the consolidated access point 236 may accordingly allocate uplink resources with less temporal frequency but each allocation may comprise a greater than conventional amount of radio resources; that is, by delaying otherwise separate uplink transmissions and aggregating uplink data into fewer, more consolidated uplink transmissions, the overall power needed to operated uplink transmission components (e.g., power amplifier(s) of a fixed wireless access device) may be reduced to fewer on/off cycles.

Whether using the immediate uplink resource allocation mode or the delayed uplink resource allocation mode, the consolidated access point 236 will determine the power modulation coding scheme and uplink transmission power for the particular fixed wireless access device to use when transmitting the uplink data. In one aspect, the consolidated access point 236 may minimize power demands on the particular fixed wireless access device by determining the lowest modulation coding scheme available to both the consolidated access point 236 and the particular fixed wireless access device (BSK, QPSK, 8PSK, 16-QAM, 64-QAM, 1024-QAM, etc.) andthe lowest transmission power required to effectively communicate the uplink data from the particular fixed wireless access device to the consolidated access point 236, based on the sounding signal and the channel quality report (and/or based on channel condition determined by the consolidated access point 236), wherein said determination may comprise determining one or more channel quality indicators (SINR, RSRP, RSSI, channel noise, and the like) and determining the amount of uplink power that would be necessary to effectively communicate with the consolidated access point in view of the channel quality indicators. In another aspect, the consolidated access point 236 may determine the most spectrally efficient modulation coding scheme available to both the consolidated access point 236 and the particular fixed wireless access device based on the maximum available power available to the particular fixed wireless access device; for example, if the particular fixed wireless access device is supplied with 15 watts of power (the amount of power available to the fixed wireless access device to transmit in the uplink being based on signaling from the fixed wireless access device to the consolidated access point 236, or based on the consolidated access point 236 querying a remote registration server (e.g., a unified data repository, access mobility function, home subscription system, or the like)) and 5 watts of the power is the minimum uplink transmission power based on the determined channel conditions, the consolidated access point 236 may determine a power headroom available to the fixed wireless access device and then determine the highest modulation coding scheme that can be used within the power headroom—maximizing spectral and power efficiency. Continuing with the previous example, the consolidated access point 236, after determining that 5 watts were necessary to use as uplink transmission power and that 10 watts of power headroom exists, may determine that the highest available modulation scheme that uses less than 10 watts is QPSK (c.f., 8PSK would require more power and PSK would be possible with less power if the power headroom was less). Once the consolidated access point 236 has determined the modulation coding scheme and uplink transmission power and allocated uplink radio resources, the consolidated access point 236 communicates the modulation coding scheme, power, and allocation instructions to the particular fixed wireless access device. In response, the particular fixed wireless access device packages the uplink data for transmission and then transmits the uplink data to the consolidated access point 236, via the distribution node 240, using the instructed modulation coding scheme and uplink transmit power. In response to the particular fixed wireless access device transmitting the uplink data, the consolidated access point 236 communicates an acknowledgement to the particular fixed wireless access device.

The consolidated access point 236 may utilize a modified downlink messaging sequence in order to provide enhanced connectivity between the RAN 202 and fixed wireless access devices. Instead of operating in a conventional mode, the MUS-TU 240 of the consolidated access point 236, acting as a controller for resource scheduling, may interact with a particular fixed wireless access device, such as the first fixed wireless access device 220 (said interaction occurring via a distribution node as described above) using a multiple access scheme (e.g., orthogonal frequency division multiple access (OFDMA), time division multiple access (TDMA), code division multiple access (CDMA), or the like). The particular fixed wireless access device will monitor a control channel having a relatively narrow band (relative to the band used to communicate downlink data) for an indication from the consolidated access point 236 that the consolidated access point 236 has downlink data for the particular fixed wireless access device. Then, the consolidated access point 236 may schedule downlink resources for immediate transmission to the particular fixed wireless access device or may delay the scheduling, accumulate downlink data for the particular fixed wireless access device, and schedule downlink resources for transmission after a certain delay (e.g., 1, 5, 10, 100 ms). Whether the downlink data is scheduled immediately or after a delay to accrue downlink data, the consolidated access point 236 instructs the particular wireless access device the bandwidth and modulation coding scheme of the downlink signal in order that that fixed wireless access can appropriately tune in to receive the downlink data from the consolidated access point 236. In one aspect, the consolidated access point 236 may communicate the downlink data to the particular fixed wireless access device using a modulation coding scheme having the highest spectral efficiency available to both the consolidated access point 236 and the particular fixed wireless access device (e.g., 8-phase phase shift keying (8-PSK), quadrature amplitude modulation (QAM), or the like), in order to maximize downlink data transfer. In other aspects, the consolidated access point 236 may utilize a lower-order modulation coding scheme (e.g., QPSK) to communicate the downlink data to the particular fixed wireless access device, in order to conserve power at the particular fixed wireless access device (e.g., if the fixed wireless access device has a limited power supply due to being inductively charged). Once the fixed wireless access device has successfully received and/or decoded the downlink data, the fixed wireless access device communicates an acknowledgement to the consolidated access point 236.

Within the network environment 200, one or more units, such as the first unit 216, the second unit 218, the third unit 217, and the fourth unit 219 may comprise an exterior wall and/or an exterior window, proximate to which a fixed wireless access device may be situated. Turning now to FIGS. 4A-4E, various exemplary embodiments of a fixed wireless access device suitable for operation with the current disclosure are illustrated. Though illustrated and discussed as separate embodiments, it is specifically envisaged that a fixed wireless access device could comprise any one or more characteristics of each the separately illustrated/discussed embodiments. Each of FIGS. 4A-4E illustrate a fixed wireless access device 400 that is disposed proximate to an exterior wall 408 or exterior window 406 of a unit such as the first, second, third, or fourth unit 216-219 of FIG. 2. Though illustrated in each of FIGS. 4A-4E as being disposed adjacent to the exterior window 406, it is conceived that if a particular unit did not have an exterior window, for example, that the fixed wireless access device 400 could be situated adjacent to the exterior wall 408 or an exterior door. Though particular arrangements of the fixed wireless access device 400 vary between FIGS. 4A-4E and are discussed with focus on their particular arrangements, the fixed wireless access device 400 of FIGS. 4A-4E may have certain components in common.

In order to minimize attenuation of the wireless link between the fixed wireless access device 400 and a consolidated access point as described with respect to FIGS. 2-3, and to also minimize attenuation between the fixed wireless access device 400 and subscriber devices inside a unit of an MUS, the fixed wireless access device 400 shown in FIGS. 4A-4E comprises an exterior portion 404 and an interior portion 402. The exterior portion 404 of FIGS. 4A-4D comprises an exterior coupling component 405, and the interior portion 402 of FIGS. 4A-4D comprises an interior coupling component 407. Each of the exterior coupling component 405 and the interior coupling component 407 are configured to hold the exterior portion 404 and the interior portion 402 of the fixed wireless access device 400 in place. Though shown as being centrally situated on the exterior/interior portions, either or both of the exterior coupling component 405 and the interior coupling component 407 may be in any desirable portion of the exterior portion 404 and the interior portion 402. Particularly in aspects where the fixed wireless access device 400 is installed adjacent to the exterior window 406 (such as illustrated in FIGS. 4A-4E), each of the exterior coupling component 405 and the interior coupling component 407 may take the form of a suction cup, adhesive, or other non-destructive form of coupling the exterior portion 404 and the interior portion 402 to the exterior window 406 such that when removed, the underlying substrate to which the fixed wireless access device was coupled to (e.g., a glass window) is in the same general condition as before the fixed wireless access device 400 was installed. In aspects where the fixed wireless access device 400 is configured to be coupled to the exterior wall 408, the exterior coupling component 405 and the interior coupling component 407 may take the form of a non-destructive component or may take a form that may leave the substrate to which it was coupled in a different condition compared to before installation; for example, each of the exterior coupling component 405 and the interior coupling component 407 may utilize screws (e.g., masonry screws), anchors (e.g., drywall anchors), or the like. The exterior coupling component 405 and the interior coupling component 407 may couple the exterior portion 404 to the interior portion 402 (c.f., coupling the exterior portion 405 to the exterior window 406 and, separately, coupling the interior portion 402 to the exterior window 406); for example, each of the exterior coupling component 405 and the interior coupling component may comprise a magnet (e.g., a rare earth magnet). In some aspects, such as when the fixed wireless access device 400 is utilized in a high-rise MUS, the exterior coupling component 405 and the interior coupling component 407 may comprise a tether (e.g., string, ribbon, wire, or the like) that would prevent the exterior portion 404 from falling if it became uncoupled from the exterior window 406 or the exterior wall 408. In but one example of how characteristics of the exterior coupling component 405 and the interior coupling component 407 could be combined, the exterior coupling component 405 may comprise an adhesive (e.g., near the middle of the exterior portion 404), a rare earth magnet (e.g., near one or more outer perimeters of the face of the exterior portion 404 that is configured to be adjacent to the exterior window 406 or exterior wall 408), and a tether that connects the exterior portion 404 to the interior portion 402 (or some other object on the interior side of the external window 406 or exterior wall 408, such as a drywall anchor, screw, or the like).

The fixed wireless access device 400 of the present disclosure comprises one or more components or subsystems that are configured to provide a usable connection to devices such as a user device 434 located within a unit of the MUS. In order to provide the usable connection, the fixed wireless access device 400 may comprise or may be communicatively coupled to a separate apparatus that comprises a router 420. As used in its conventional sense, the router 420 is configured to provide a bridge between the user device 434 and a broader network, such as the network 201 of FIG. 2. The router 420 may be configured to wirelessly communicate with the user device 434, for example using Wi-Fi (802.11) protocol, utilizing an interior downlink signal 430 and an interior uplink signal 432. The router 420 may additionally or alternatively be configured to communicate using a wired connection; for example, the router 420 may comprise a local area network port, such as would be compatible with coaxial, cat5, cat6, or similar cabling.

The fixed wireless access device 400 of FIGS. 4A-4E comprises one or more components or subsystems that are configured to provide the necessary power for the various components of the fixed wireless access device 400 to operate. Components of the exterior portion 404 of the fixed wireless access device 400 needing power will be connected to the exterior power supply 414. The exterior power supply is configured to receive power from the interior power supply 416 via a power connection 422 and provide power, as necessary, to components in the exterior portion 404 of the fixed wireless access device 400. In aspects where the fixed wireless access device 400 is installed adjacent to the exterior window 406, the power connection 422 may take the form of a wireless connection, wherein the interior power supply 416 is an inductive power transmitter (e.g., a qi-enabled wireless charger) and the exterior power supply 414 is an inductive power receiver. In aspects where the power connection 422 is wireless, the exterior coupling component 405 and the interior coupling component 407 may be specifically positioned in order that the exterior power supply 414, comprising an inductive power receiver, is usably positioned within the electromagnetic field generated by the interior power supply 416. In aspects where the fixed wireless access device 400 is installed adjacent to the exterior wall 408, the power connection 422 may comprise a wired connection that is ran through a through-hole in the exterior wall 408. In addition to supplying power to the exterior power supply 414, the interior power supply 416 component or subsystem powers all necessary interior components and interface with a device power supply 417. The device power supply may, in turn, comprise an outlet for being plugged into a power receptacle on or near the exterior wall 408 in the interior side of the unit or comprise a hard-wired power supply configured to be directly connected to power cabling in the unit (e.g., in a junction box).

Figure 4A:
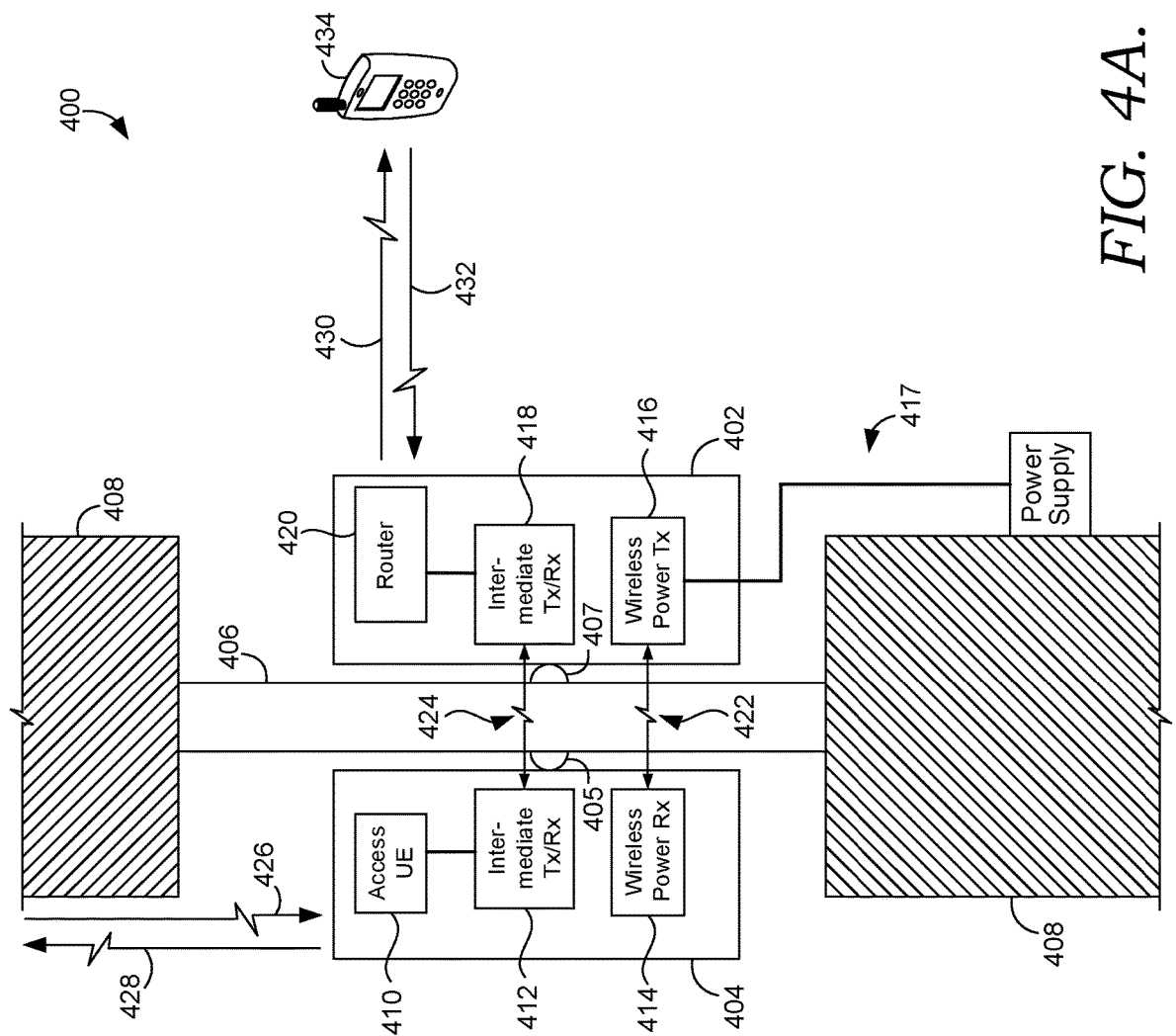

Turning now to FIG. 4A, a first embodiment of a fixed wireless access device 400 is illustrated. In the embodiment of FIG. 4A, the fixed wireless access device 400 separates the components or subsystems that are configured to be connected to the consolidated access point, such as any form of the consolidated access point 236 described with respect to FIGS. 2-3, and the components or subsystems that are configured to be connected to the user device 434 inside a unit of the MUS. As illustrated in FIG. 4A, the exterior portion 404 of the fixed wireless access device 400 may comprise an access UE 410, exterior intermediate transceiver 412, and the exterior power supply 414, and the interior portion 402 of the fixed wireless access device 400 may comprise the router 420, an interior intermediate transceiver 418, and the interior power supply 416.

The access UE 410 is configured to receive a downlink signal 426 from the consolidated access point 236 or the radio access network 202 of FIGS. 2-3 and transmit an uplink signal 428 thereto. Accordingly, the access UE 410 may take the form of the access UE described with respect to the computing device 100 of FIG. 1; alternatively, the access UE 410 may comprise any combination of components having any one or more features or functionality described with respect to the computing device 100 of FIG. 1. The access UE 410 comprises at least an antenna system that utilizes one or more antennas to receive the downlink signal 426 and transmit the uplink signal 428. In aspects, the access UE 410 comprises a directional antenna system that utilizes beamforming (e.g., electronic beamforming based on supplying signals with varying amplitude and phase to a plurality of antenna elements, physical beamforming using a device to focus the downlink signal 426 and/or the uplink signal 428, or a combination of electronic and physical beamforming). Though not shown in FIG. 4A, the access UE 420 may comprise a single antenna system that is selectively utilized for receiving the downlink signal 426 and transmitting the uplink signal 428; alternatively, the access UE 410 may comprise two or more antenna subsystems, each dedicated to either transmit the uplink signal 428 or receive the uplink signal 426 (e.g., a first set of antenna elements form a transmit-only array and a second set of antenna elements form a receive-only array). In aspects with dedicated transmit and receive elements, the elements forming the first set (transmit-only) may be cross-polarized with the elements forming the second set (receive-only) in order to reduce interference, and the consolidated access point, such as the consolidated access point 236 of FIGS. 2-3, may similarly comprise cross-polarized transmit-only and receive-only elements. The access UE 410 comprises one or more computer processing components that schedule and/or control the transmission of the uplink signal 428 in accordance with any one or more aspects of the uplink messaging sequence and the downlink messaging sequence described with respect to FIG. 2. The one or more computer processing components of the access UE 410 is configured to communicate with the exterior intermediate transceiver 412, which, though shown as a stand-alone component in FIG. 4A, may be combined with the access UE 410. The communication between the access UE 410 and the exterior intermediate transceiver 412 may, in some aspects, involve converting the wireless downlink signal 426 from having a first set of characteristics (e.g., having a 5G frame format) to a signal having a second set of characteristics (e.g., having an Ethernet frame format) and conversely convert a signal received from the exterior intermediate transceiver 412 from having the second set of characteristics to become the uplink signal 428 having the first set of characteristics.

Continuing with FIG. 4A, the exterior portion 404 of the fixed wireless access device 400 may comprise an exterior intermediate transceiver 412 and the interior portion 402 of the fixed wireless access device 400 may comprise an interior intermediate transceiver 418 that are configured to bridge the exterior window 406 or exterior wall 408. The exterior intermediate transceiver 412 and the interior intermediate transceiver 418 are configured to have a point to point data connection 424 there between. In aspects such as the one shown in FIG. 4A, where the fixed wireless access device 400 is installed adjacent to the exterior window 406, the data connection 424 is wireless (e.g., using a UHF, SHF, or EHF wireless connection); in aspects where the fixed wireless access device 400 is installed adjacent to the exterior wall 408, the data connection 424 may be wireless or may take the form of a wired connection (e.g., Ethernet, coaxial) that runs through a through-hole in exterior wall 408. In aspects where the data connection 424 takes a wireless form, the data connection 424 may utilize a carrier frequency, channel, and/or protocol that is different than the wireless link between the access UE 410 and a consolidated access point (i.e., the downlink signal 426, the uplink signal 428) and the wireless link between the router 420 and the user device 434 (i.e., the interior downlink 430, and the interior uplink 432). The interior intermediate transceiver 418, in turn, is configured to communicate with the router 420; like the exterior intermediate transceiver 412, the interior intermediate transceiver may be a separate component or subsystem from the router 420 (as illustrated in FIG. 4A) or the interior intermediate transceiver 418 may be a part of the router 420. In other words, the access UE 410 and the router 420 may be communicatively coupled via the data connection 424, which is maintained using the exterior intermediate transceiver 412, and the interior intermediate transceiver 418.

Turning now to FIG. 4B, a second embodiment of the fixed wireless access device 400 is illustrated. In the embodiment of FIG. 4B, the fixed wireless access device 400 has a minimal interior footprint by combining the components or subsystems that are configured to be connected to the consolidated access point, such as any form of the consolidated access point 236, or the radio access network 202 described with respect to FIGS. 2-3, and the components or subsystems that are configured to be connected to the user device 434 inside a unit of the MUS. As illustrated in FIG. 4B, the exterior portion 404 of the fixed wireless access device 400 may comprise the access UE 410, the router 420, and the exterior power supply 414, and the interior portion 402 of the fixed wireless access device 400 may comprise the interior power supply 416. The access UE 410 of FIG. 4B may have any of the characteristics described with respect to the access UE 410 of FIG. 4A. In aspects of the fixed wireless access device 400, such as the one shown in FIG. 4B, where the router 420 is included in the exterior portion 404, the router 420 is configured to transmit the interior downlink signal 430 and receive the interior uplink signal 432 through the exterior window 406 (or any other exterior surface to which the fixed wireless access device 400 is mounted, such as the exterior wall 408). Though shown as being separate components in FIG. 4B, in embodiments where the access UE 410 and the router 420 are both in the exterior portion 404 of the fixed wireless access device 400, the access UE 410 and the router 420 may be separated or may take the form of a single component/subsystem.

Figure 4C:
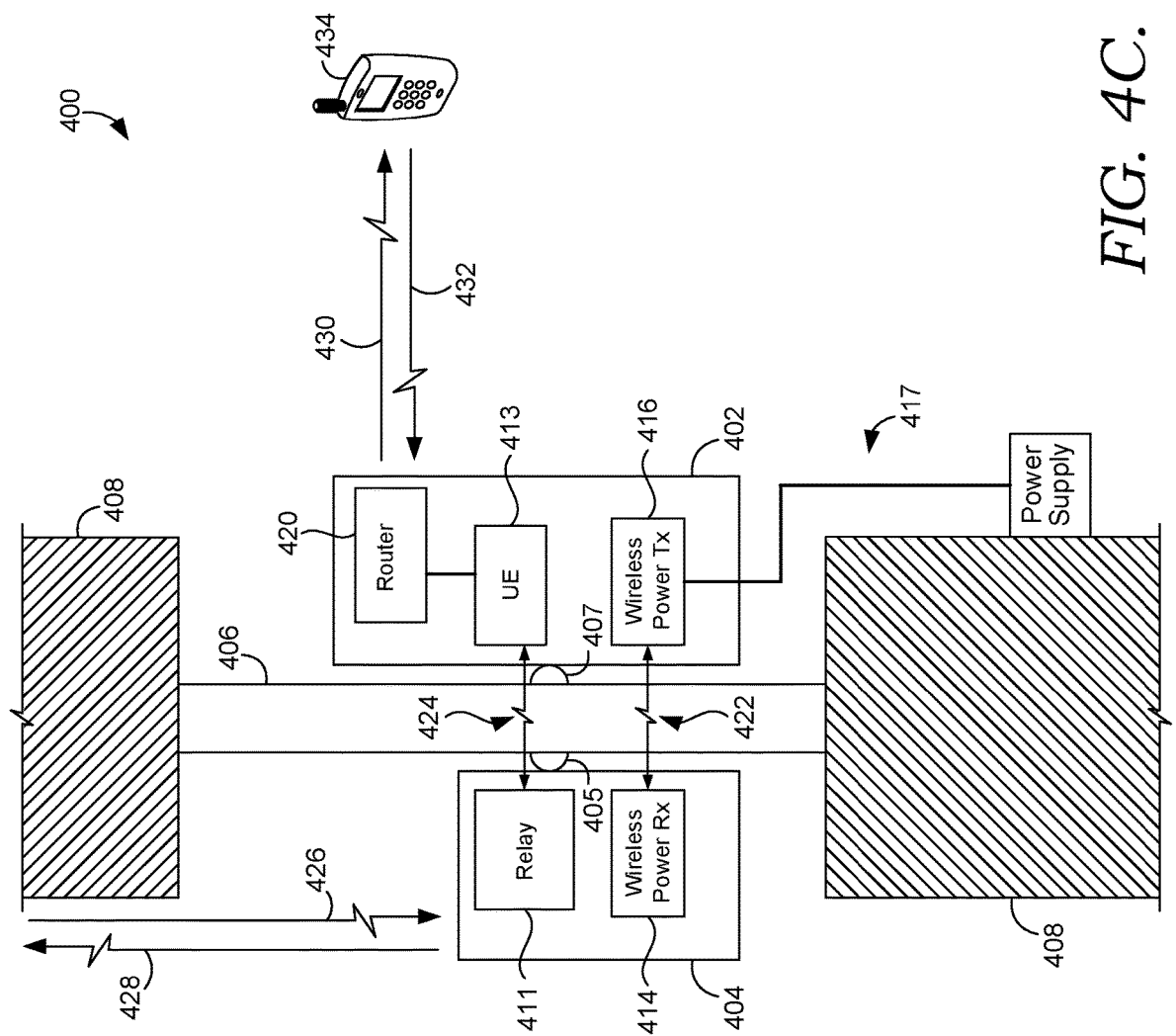

Turning now to FIG. 4C, a third embodiment of the fixed wireless access device 400 is illustrated. In the embodiment of FIG. 4C, the fixed wireless access device 400 has a minimal exterior footprint while still minimizing attenuation between the fixed wireless access device 400 and the consolidated access point, such as any form of the consolidated access point 236, or the radio access network 202 described with respect to FIGS. 2-3. As illustrated in FIG. 4C, the exterior portion 404 of the fixed wireless access device 400 may comprise a relay 411 and the exterior power supply 414, and the interior portion 402 may comprise the router 420, a UE 413, and the interior power supply 416. In contrast to other embodiments, such as those shown in FIGS. 4A-4B, the embodiment of the fixed wireless access device 400 illustrated in FIG. 4B comprises fewer components in the exterior portion 404. For example, instead of having an access UE 410 in the exterior portion 404, the exterior portion 404 may comprise the relay 411 and the interior portion 402 may comprise the UE 413. The relay 411 is generally configured only to receive the downlink signal 426 and relay the received signal to the UE 413 via the data connection 424 and to receive a signal from the UE 413 via the data connection 424 and transmit the uplink signal 428. Accordingly, the relay 411 may take the form of a repeater and comprise a first antenna configured to communicate with a consolidated access point, a second antenna configured to communicate with the UE 413, and a bi-directional amplifier. In deployments where the fixed wireless access device 400 is adjacent to the exterior wall 408 or other building material (as opposed to a glass or glass-like window/door), the relay 411 may comprise the first antenna (with or without an amplifier) and be connected to the UE 413 via a wired connection (e.g., feed cable) through the exterior wall 408. In aspects where the UE 413 is separated from the relay 411, the UE 413 may comprise any one or more features or characteristics of the computing device 100 of FIG. 1, including one or more computer processing components that schedule and/or control the fixed wireless access device signaling in accordance with any one or more aspects of the uplink messaging sequence and the downlink messaging sequence described with respect to FIG. 2. Though shown as separate components, the UE 413 may alternatively be combined with the router 420.

Figure 4D:
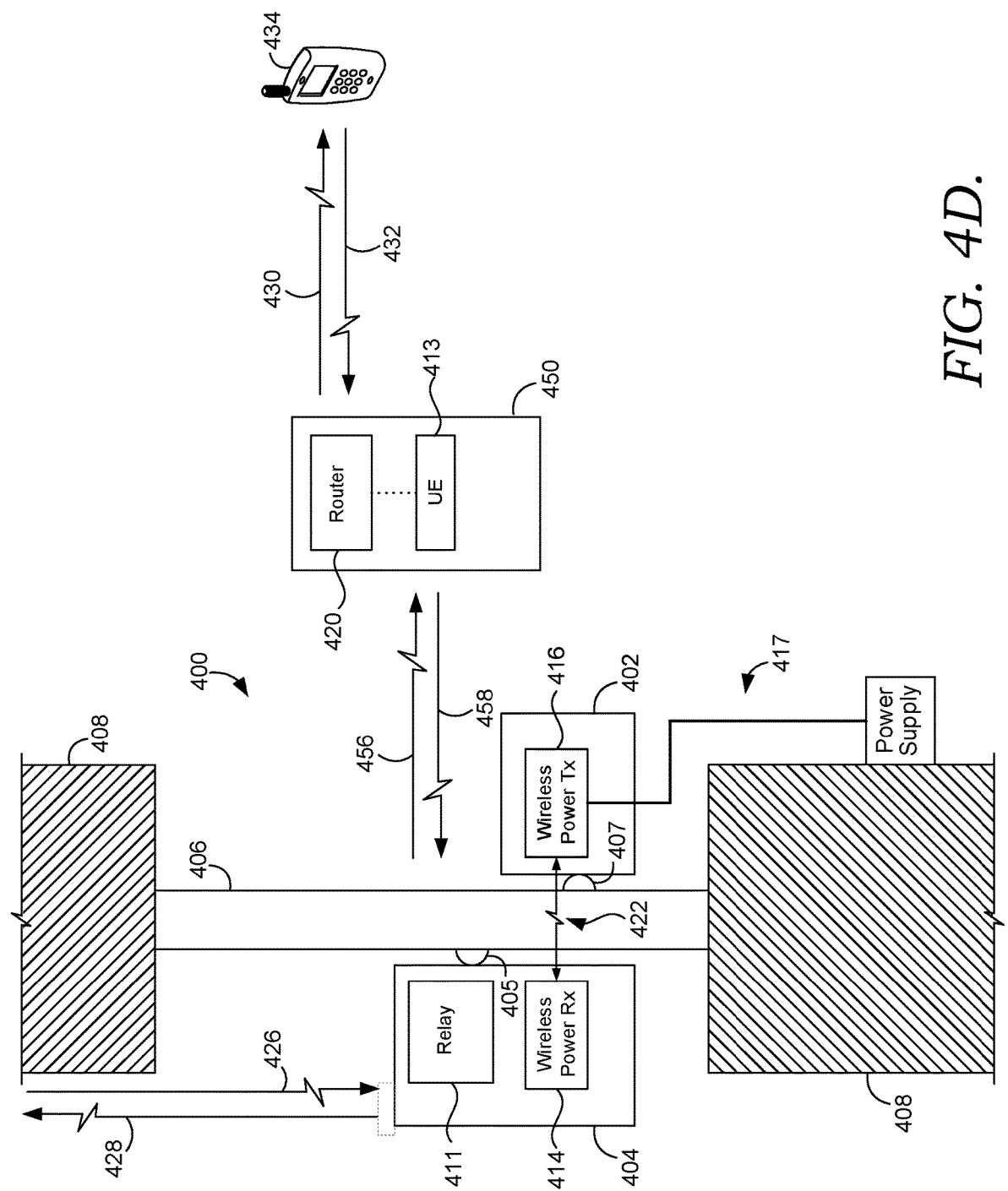

Turning now to FIG. 4D, a fourth embodiment of a fixed wireless access device 400 is illustrated. In the embodiment of FIG. 4D, the fixed wireless access device 400 has a minimal footprint adjacent to the exterior of a unit (e.g., the exterior window 406 or the exterior wall 408) while still minimizing attenuation between the fixed wireless access device 400 and the consolidated access point, such as any form of the consolidated access point 236, or the radio access network 202 described with respect to FIGS. 2-3. As illustrated in FIG. 4D, the exterior portion 404 of the fixed wireless access device 400 may comprise a relay 411 and the exterior power supply 414, and the interior portion 402 may comprise the interior power supply 416. In contrast to other embodiments, such as those shown in FIGS. 4A-4C, the embodiment of the fixed wireless access device 400 illustrated in FIG. 4B comprises fewer total components in the exterior portion 404 and the interior portion 402. For example, instead of having an access UE 410 incorporated into the fixed wireless access device 400, the exterior portion 404 may comprise the relay 411 and a separate consumer premises equipment (CPE) device 450 may comprise the UE 413. The relay 411 illustrated in FIG. 4D is generally configured only to receive the downlink signal 426 and relay the received signal to the UE 413 via an intermediate downlink signal 456 and to receive a signal from the UE 413 via an intermediate uplink signal 458 and transmit the uplink signal 428.

The relay 411 illustrated in FIG. 4D may have any one or more of the characteristics or features of the relay 411 described with respect to FIG. 4C. In aspects, the relay 411 may be configured to transmit the intermediate downlink signal 456 to the UE 413 using the same protocol as the downlink signal 426 but on a different channel than the downlink signal 426, so as to prevent undesirable interference. The stand-alone CPE device 450 may comprise the UE 413 and the router 420. In order to optimize bandwidth by using higher frequencies, the fixed wireless access device 400 and the CPE device 450 may be configured to be within line of sight of one another; accordingly, the antenna systems of the relay 411 and the UE 413 used to communicate the intermediate downlink signal 456 and the intermediate uplink signal 458 may be configured to communicate in the UHF, SHF, or EHF band (e.g., mmWaves). The UE 413 may comprise any one or more features or characteristics of the computing device 100 of FIG. 1, including one or more computer processing components that schedule and/or control the fixed wireless access device signaling in accordance with any one or more aspects of the uplink messaging sequence and the downlink messaging sequence described with respect to FIG. 2. The UE 413 may be configured to transmit the intermediate uplink signal 458 to the relay 411 using the same protocol as the uplink signal 428 but on a different channel than the uplink signal 428 and on a different channel or using a different polarization than the intermediate downlink signal 456. Though shown as separate components within the CPE device 450, the UE 413 may alternatively be combined with the router 420.

Figure 4E:
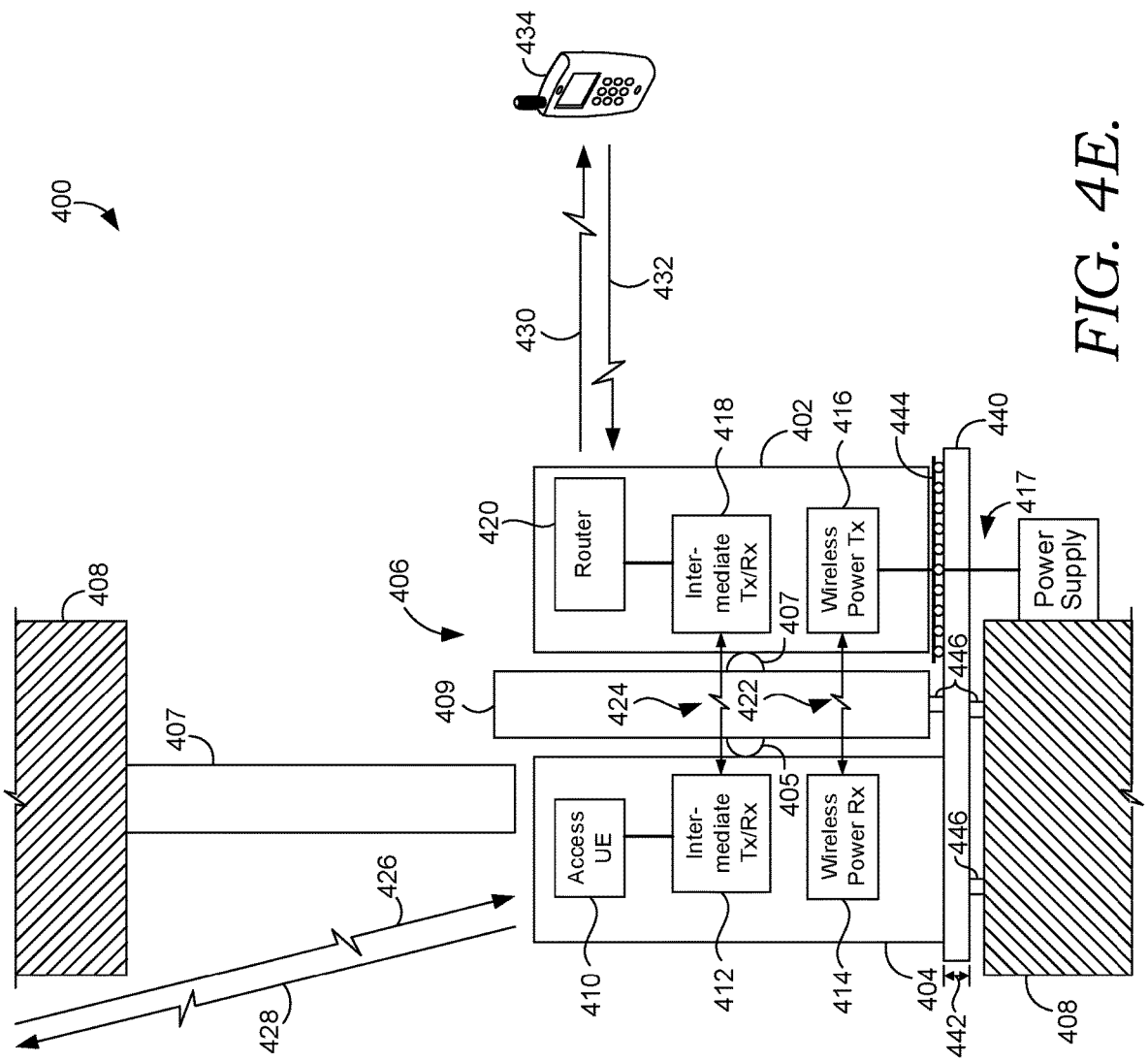

Turning now to FIG. 4E, a fifth embodiment of a fixed wireless access device 400 is illustrated. In the embodiment of FIG. 4E, the fixed wireless access device 400 is configured to be deployed/installed in a window sill or other window opening. With respect to FIG. 4E, the exterior window 406 may be said to comprise a fixed portion 407 and a movable portion 409, wherein the movable portion 409 may be opened sufficient to allow the exterior portion 404 of the fixed wireless access device 400 to be pushed outside. Though illustrated as being capable of sliding vertically, the movable portion 409 may alternatively be capable of sliding horizontally, being extended radially (i.e., if a first vertical edge of the movable portion 409 was hinged and the second vertical edge opposite the first vertical edge opened outward). The exterior portion 404 of the fixed wireless access device 400 of FIG. 4E comprises the access UE 410, exterior intermediate transceiver 412, and the exterior power receiver 414 described with respect to FIG. 4A. The interior portion 402 of the fixed wireless access device 400 comprise the router 420, interior intermediate transceiver 416, and the interior power transmitter 416 described with respect to FIG. 4A. The exterior portion 404 may be coupled to a sill plate 440 and the sill plate 440 have a thickness 442 (e.g., ⅟₁₆-½ an inch), and may comprise a plurality of gaskets 446 that form a weatherproof seal from the window 406 to the wall 408, and between the exterior portion 404 of the fixed wireless access device 400 and the exterior wall 408. In one aspect, the exterior portion 404 of the fixed wireless access device is configured to stand off from the window 406, wherein the exterior coupling component 405 may be absent or may comprise a suction cup or other coupling means that would not inadvertently attach to the exterior portion of the window 406 and be difficult to move away. In another aspect, the exterior portion 404 of the fixed wireless access device 400 is configured to be adjacent to the window 406, wherein the exterior coupling component 405 may comprise a magnet or other ferro-attractive material and the interior coupling component 407 also comprises a magnet or other ferro-attractive material that causes the exterior portion 404 to be magnetically held in place with the interior portion 402 (through the window 406). In aspects, in order to the magnetic coupling of the exterior portion 404 and the interior portion 402 of the fixed wireless access device 400, the interior portion may be coupled to the sill plate 440 via a roller system 444 that allows the interior portion 402 to be slid towards the window 406. In this way, the exterior portion 404 may be placed through an opening created by operating the movable portion 409 of the window 406; then, the movable portion 409 can be closed down on to the sill plate 440; then, the sill plate 440 could be pulled inwards so that the exterior portion 404 is against the exterior surface of the movable portion 409 of the window 406; finally, the interior portion 402 could be slid against the window using the roller assembly 404 until both the exterior coupling component 405 and the interior coupling component 407 are secured against the movable portion 409 of the window 406 (or, in aspects where the exterior and/or interior coupling components 405, 407 take the form of magnets, a magnetic force attracts the exterior portion 404 to the interior portion 402).

Figure 5:
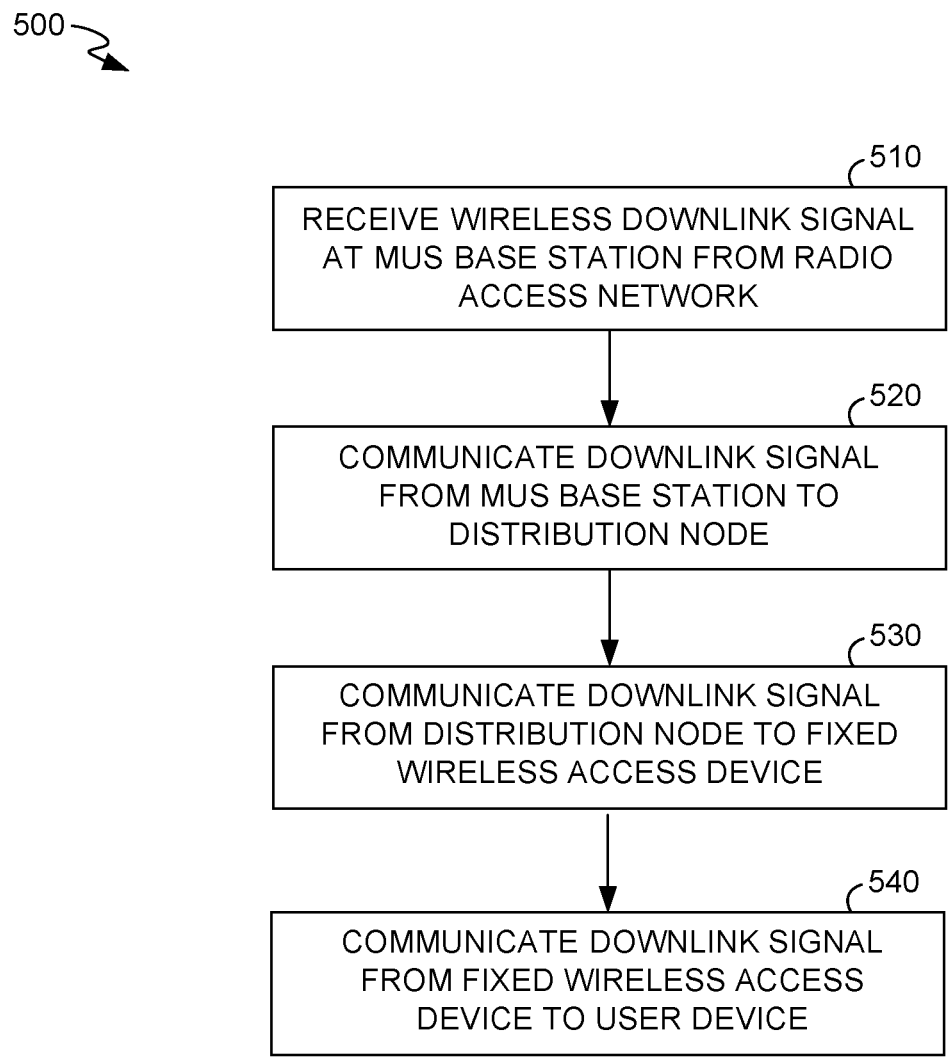
FIG. 5 illustrates a flow diagram of a method for providing fixed wireless access to a unit of a multi-unit structure in accordance with embodiments described herein.

Turning now to FIG. 5, a flow chart is provided that illustrates one or more aspects of the present disclosure relating to a method for providing downlink connectivity to a fixed wireless access device. At a first step 510, a base station, such as the MUS-TU 240 coupled to a multi-unit structure (MUS) such as the MUS 210 of FIG. 2, receives a wireless signal from a radio access network, such as the radio access network 202 of FIG. 2, according to any one or more aspects described with respect to FIG. 2. At a second step 520, a distribution node, such as the first distribution node 228 or the second distribution node 230, coupled to the MUS receives a downlink signal from the base station. At a third step 530, the distribution node communicates a downlink signal to a fixed wireless access device, such as the fixed wireless access device 400 of FIGS. 4A-4E. The communication of the downlink signal at step 530 may be done according to any one or more aspects described with respect to the downlink messaging sequence discussed with respect to FIG. 2. Without limitation, the communication at step 530 may comprise transmitting control information to the fixed wireless access device on a channel having a first bandwidth (e.g., 5-15 MHz), the control information comprising an indication that the distribution node has downlink data for the fixed wireless access device. The step 530 may further comprise scheduling downlink data to be transmitted to the fixed wireless access device on a channel having a second bandwidth (e.g., 15-120 MHz), wherein the second bandwidth is greater than the first bandwidth. The step 530 may further comprise the fixed wireless access device receiving the downlink data and communicating an acknowledgement to the distribution node. At a fourth step 540, the fixed wireless access device may communicate a downlink signal to a user device, such as the user device 434 of FIGS. 4A-4E, according to any one or more aspects described with respect to FIGS. 2-4E.

Figure 6:
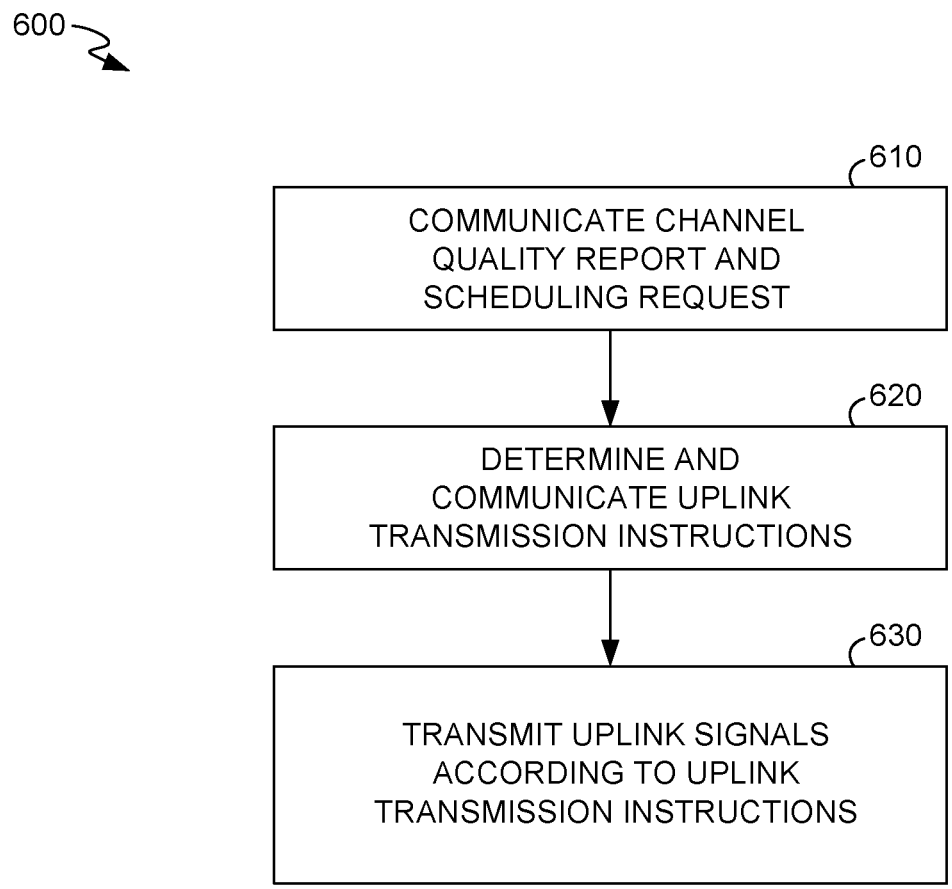
FIG. 6 illustrates a flow diagram of a method for managing uplink signals in a fixed wireless access system associated with a multi-unit structure, in accordance with embodiments described herein.

Turning now to FIG. 6, a flow chart is provided that illustrates one or more aspects of the present disclosure relating to a method for managing uplink connectivity between a fixed wireless access device, such as the fixed wireless access device 400 of FIGS. 4A-4E, and a consolidated access point, such as the consolidated access point 236 of FIG. 2. At a first step 610, a channel quality report or channel quality information and an uplink scheduling request is communicated from the fixed wireless access device to the consolidated access point, wherein the consolidated access point may be coupled to a roof of a multi-unit structure (MUS), such as the MUS 210 of FIG. 2 and the fixed wireless access device is coupled to an exterior window or an exterior wall of a unit within the MUS. The channel quality report and uplink scheduling request may comprise any one or more aspects of the uplink messaging sequence described with respect to FIG. 2. In aspects, the fixed wireless access device communicates a first uplink scheduling request to the consolidated access point for a first amount of radio resources in response to receiving a first amount of uplink data from a connected user device, wherein the first amount of radio resources corresponding to the first amount of uplink data from the connected user device. In some aspects, the first step 610 may additionally comprise the fixed wireless access device communicating a second uplink scheduling request to the consolidated access point for a second amount of radio resources in response to receiving a second amount of uplink data from the connected user device, wherein the second amount of radio resources corresponds to the second amount of uplink data from the connected user device.

At a second step 620, the consolidated access point determines and communicates uplink transmission instructions to the fixed wireless access device according to any one or more aspects of the uplink messaging sequence described with respect to FIG. 2. Without limitation, the second step 620 may comprise determining, based at least in part on the channel quality report, an uplink transmission power necessary for the fixed wireless access device; the second step 620 may further comprise determining, based on the power supplied to the fixed wireless access device and the uplink transmission power, a power headroom available to the fixed wireless access device; the second step 620 may further comprise determining a modulation coding scheme that requires less power than the power headroom. In aspects, a modulation coding scheme will be selected that utilizes the greatest amount of power headroom; in other aspects, a modulation coding scheme will be selected that requires the least power but is compatible with both the fixed wireless access device and the consolidated access point. In addition to the modulating scheme and uplink transmission power, the consolidated access point may determine or schedule an uplink allocation and communicate the uplink instructions from the consolidated access point to the fixed wireless access device. In aspects the uplink allocation corresponds to a third amount of radio resources, the third amount of radio resources being greater than each of the first and the second amount of radio resources.

At a third step 630, the fixed wireless access device transmits the first amount of uplink data together with the second amount of uplink data corresponding to the third amount of radio resources to the consolidated access point according to the uplink transmission instructions. The third step 630 may further comprise the consolidated access point communicating an acknowledgement to the fixed wireless access device in response to successfully receiving the first amount uplink data and the second amount of uplink data.

Many different arrangements of the various components depicted, as well as components not shown, are possible without departing from the scope of the claims below. Embodiments in this disclosure are described with the intent to be illustrative rather than restrictive. Alternative embodiments will become apparent to readers of this disclosure after and because of reading it. Alternative means of implementing the aforementioned can be completed without departing from the scope of the claims below. Certain features and subcombinations are of utility and may be employed without reference to other features and subcombinations and are contemplated within the scope of the claims In the preceding detailed description, reference is made to the accompanying drawings which form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the preceding detailed description is not to be taken in the limiting sense, and the scope of embodiments is defined by the appended claims and their equivalents.

What is claimed is:

1. A system for providing fixed wireless access to a multi-unit structure (MUS) comprising:
    a radio access network;
    an MUS terminal unit (MUS-TU) coupled to a multi-unit structure, the MUS-TU comprising a first antenna system configured to be wirelessly connected to the radio access network; and
    a second antenna system communicatively coupled to the MUS-TU and configured to directionally transmit downlink signals to one or more fixed wireless access devices and receive signals from the one or more fixed wireless access devices, wherein the downlink signals are directionally transmitted coplanar with an exterior wall of the multi-unit structure along which the one or more fixed wireless access devices are disposed.

2. The system of claim 1, wherein the MUS-TU is located at a first location and the second antenna system is located at a second location, the first location different than the second location.

3. The system of claim 1, wherein the MUS-TU is coupled to a roof of the multi-unit structure.

4. The system of claim 3, wherein the second antenna system is coupled to a roof edge of the multi-unit structure.

5. The system of claim 1, wherein a first set of signals are communicated from the MUS-TU to the radio access network on a first frequency band and a second set of signals are communicated from the second antenna system to the one or more fixed wireless device on a second frequency band, the first frequency band different than the second frequency band.

6. The system of claim 1, wherein the second antenna system is configured to directionally transmit the downlink signals to the one or more fixed wireless access devices according orthogonal frequency division multiple access.

7. The system of claim 1, wherein the MUS-TU performs a method comprising:
    receiving, via the second antenna system, a channel quality report and an uplink scheduling request from a fixed wireless access device of the one or more fixed wireless access devices, the scheduling request comprising a request for a first amount of uplink radio resources;
    determining, based at least in part on the channel quality report, an uplink transmission power necessary for the fixed wireless access device;
    determining, based on an amount of power supplied to the fixed wireless access device and the uplink transmission power, a power headroom available to the fixed wireless access device;
    determining a modulation coding scheme that requires less power than the power headroom;
    communicating, via the second antenna system, an uplink transmission instruction to the fixed wireless access device, the uplink transmission instruction comprising the uplink transmission power, the modulation coding scheme, and an uplink resource allocation, wherein the uplink resource allocation is for a second amount of uplink radio resources, the second amount of uplink radio resources greater than the first amount of uplink radio resources; and
    receiving, via the second antenna system, uplink data from the fixed wireless access device according to the uplink transmission instruction.

8. The system of claim 7, wherein subsequent to receiving, via the second antenna system, uplink data from the fixed wireless access device, the MUS-TU is further configure to communicate the uplink data from the fixed wireless access device to the radio access network via the first antenna system.

9. A device for providing fixed wireless access to a unit of a multi-unit structure, the device comprising:
an interior portion comprising a wireless power transmitter and a router, wherein the router is configured to communicate with one or more user devices using a wireless link and a first set of frequencies; and
an exterior portion comprising a wireless power receiver configured to wirelessly receive power from the wireless power transmitter and an access user equipment (UE), wherein the access UE is configured to wirelessly communicate with an access point using a second set of frequencies and is communicatively coupled to the router using a third set of frequencies, and wherein each of the first set of frequencies, second set of frequencies, and the third set of frequencies are different, wherein the access point comprises a consolidated access point configured to wirelessly communicate with a radio access network and to directionally transmit downlink signals to the device, wherein the downlink signals are directionally transmitted coplanar with an exterior wall of the multi-unit structure comprising the device.

10. The device of claim 9, wherein the interior portion further comprises an interior coupling component and the exterior portion further comprises an exterior coupling component.

11. The device of claim 10, wherein at least one of the exterior coupling component and the interior coupling component comprises a magnet configured to magnetically attract the exterior portion to the interior portion.

12. The device of claim 11, wherein the exterior coupling component further comprises an adhesive.

13. The device of claim 10, wherein the exterior portion comprises:
a first exterior coupling component that is configured to couple the exterior portion to an exterior surface of the unit of the multi-unit structure; and
a second exterior coupling component that is configured to couple the exterior portion to an interior surface of the unit of the multi-unit structure, wherein the second exterior coupling component comprises a tether.

14. The device of claim 9, wherein the exterior portion further comprises an exterior intermediate transceiver and the interior portion comprises an interior intermediate transceiver, the exterior intermediate transceiver configured to communicate signals between the access UE and the interior intermediate transceiver, and the interior intermediate transceiver configured to communicate signals between the router and the exterior intermediate transceiver.

15. The device of claim 14, wherein the exterior intermediate transceiver is communicatively coupled to the interior intermediate transceiver by a wireless link.

16. The system of claim 9, wherein the access (UE) is configured to directionally transmit uplink signals to the access point.

17. One or more non-transitory computer-readable media having computer-executable instructions embodied thereon that, when executed, cause the one or more processors to perform a method comprising:
receiving, at a distribution node, a channel quality report and an uplink scheduling request from a fixed wireless access device, the scheduling request comprising a request for a first amount of uplink radio resources;
determine, based at least in part on the channel quality report, an uplink transmission power for the fixed wireless access device;
determine, based on a power supplied to the fixed wireless access device and the uplink transmission power, a power headroom available to the fixed wireless access device;
determine a modulation coding scheme that requires less power than the power headroom;
communicate an uplink transmission instruction to the fixed wireless access device, the uplink transmission instruction comprising the uplink transmission power, the modulation coding scheme, and an uplink resource allocation, wherein the uplink resource allocation is for a second amount of uplink radio resources, the second amount of uplink radio resources greater than the first amount of uplink radio resources; and
receiving uplink data from the fixed wireless access device according to the uplink transmission instruction.

18. The one or more non-transitory computer-readable media of claim 17, wherein determining the modulation coding scheme comprises determining that the modulation coding scheme is the most spectrally efficient of a plurality of modulation coding schemes available to each of the fixed wireless access device and the distribution node.

19. The one or more non-transitory computer-readable media of claim 17, wherein determining the modulation coding scheme comprises determining that the modulation coding scheme uses the least power of a plurality of modulation coding schemes available to each of the fixed wireless access device and the distribution node.

\* \* \* \* \*